US006580812B1

(12) United States Patent
Harrington

(10) Patent No.: US 6,580,812 B1
(45) Date of Patent: Jun. 17, 2003

(54) METHODS AND SYSTEMS FOR AUTOMATICALLY ADDING MOTION LINES REPRESENTING MOTION TO A STILL IMAGE

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/217,554

(22) Filed: Dec. 21, 1998

(51) Int. Cl.[7] .................................................. G06K 9/00
(52) U.S. Cl. .......................... 382/107; 348/156; 356/27
(58) Field of Search ................................. 382/103, 107, 382/106, 166, 232; 348/452, 154, 155; 356/27; 73/488

(56) References Cited

U.S. PATENT DOCUMENTS

| | | | | |
|---|---|---|---|---|
| 4,438,438 A | * | 3/1984 | Arens et al. ................. 343/451 |
| 4,755,870 A | * | 7/1988 | Markle et al. ................ 348/34 |
| 5,544,263 A | * | 8/1996 | Iwamura ..................... 382/166 |
| 5,557,684 A | * | 9/1996 | Wang et al. ................. 382/107 |
| 5,612,743 A | * | 3/1997 | Lee .............................. 348/409 |
| 5,627,905 A | * | 5/1997 | Sebok et al. ................ 382/107 |
| 5,784,115 A | * | 7/1998 | Bozdagi ...................... 348/452 |
| 5,801,778 A | * | 9/1998 | Ju ................................ 382/416 |
| 5,982,909 A | * | 11/1999 | Erdem et al. ............... 382/103 |
| 6,047,078 A | * | 4/2000 | Kang .......................... 382/107 |
| 2001/0002205 A1 | * | 5/2001 | Beattie .................. 375/240.12 |

* cited by examiner

Primary Examiner—Jayanti K. Patel
Assistant Examiner—Barry Choobin
(74) Attorney, Agent, or Firm—Oliff & Berridge, PLC

(57) ABSTRACT

Systems and methods that add motion lines that indicate motion in a still image include selecting two or more video fields or frames, compensating for global motion in the selected fields or frames, determining the difference between positions of pixels in the selected fields or frames, identifying regions of motion with pixels having a difference that is greater than a threshold value, identifying points of interest in the regions of motion, selecting pixels from the points of interest, determining the motion of the selected points of interest, and adding lines to the still image that extend from the selected pixels.

34 Claims, 12 Drawing Sheets

METHODS AND SYSTEMS FOR AUTOMATICALLY ADDING MOTION LINES REPRESENTING MOTION TO A STILL IMAGE

BACKGROUND OF THE INVENTION

1. Field of Invention

This invention relates to methods and systems that indicate motion in a still image by inserting lines that indicate the trajectory of points of interest. More specifically, this invention is directed to methods and systems that automatically generate lines representative of the relative motion between an object and a background from a sequence of at least two video frames or fields.

2. Description of Related Art

Modern documents such as web pages, Microsoft® Word® files or PowerPoint® presentations can include motion through digital video or animations. New media are becoming increasingly available through network libraries, video conferencing, digital video camcorder and video capture devices. While these media can capture attention and communicate ideas, they are not compatible with printing.

SUMMARY OF THE INVENTION

It would be desirable to automatically represent motion information in a still image of a video signal so that the motion information is not lost when the still image of the video signal is displayed or printed.

This invention provides systems and methods that modify a still image of a video signal to represent motion in the still image This invention separately provides systems and methods that modify the still image to represent motion adding motion lines representing the motion to one or more objects and/or background features within the still image.

This invention separately provides systems and methods that modify the still image by positioning the added motion lines representing the motion so the added motion lines extend from selected points of the still image.

This invention separately provides systems and methods that modify a still image to represent relative motion between an object in the foreground of the still image and the background of the still image.

This invention separately provides systems and methods that modify the still image to represent relative motion between a foreground object and a background of the still image by adding motion lines representing the motion to one or both of points on the foreground image and points of the background.

In one exemplary embodiment, the systems and methods of this invention align two or more successive video fields or video frames by distinguishing the motion between the fields or frames caused by moving the video camera from motion within the video fields or frames. The two types of motion are characterized. The individual video field or frames are transformed to align one of the fields or frames, usually the field or frame that is earlier in time, with the other base, field or frame.

The first type of motion, which is generally referred to as "global motion", is due to movement of the camera between the fields or frames. Such movement is due to camera panning and/or zooming. The adjustment of one field or frame relative to a second field or frame necessary to generally align the features in these two fields or frames characterizes this global motion. A second type of motion, generally referred to herein as "local motion", refers to the movement of particular features between two fields or frames after the fields or frames are generally aligned for any global motion. This local motion is further characterized by the additional adjustments necessary to align these features between the two fields or frames. Once the motion between the two fields or frames is fully characterized for the features in the fields or frames, motion lines can be added to the later of the two or more fields or frames. The motion lines can be used to indicate the local motion, the global motion, or any desired combination of the global and local motion.

Global motion compensation is described in U.S. Pat. No. 5,784,115 to Gozde Bozdagi, incorporated herein by reference in its entirety.

In one exemplary embodiment of the systems and methods of this invention, where only local motion will be indicated by the motion lines, after compensating for global motion between the fields or frames, the local motion within the fields or frames can be detected. The local motion within the fields or frames is determined by taking a difference between intensity values at points of interest within the object in two successive video fields or frames. A binary mask of the region where the motion occurs is formed. The mask is formed by including only points in the base field or frame where the difference between intensity values exceeds a threshold value.

Points of interest are identified among the points included in the region of motion using various methods. In one exemplary embodiment of the systems and methods according to this invention, the points of interest are limited to those points positioned along edges. The edges are determined by identifying selected intensity gradients in the image values between a point of interest and points adjacent to that point of interest. Once the intensity gradients are determined, selected ones of the intensity gradients are selected. The selected gradients are greater than a predetermined threshold and are greater than the gradients at the adjacent points along the direction of the gradient.

In one exemplary embodiment of the systems and methods of this invention, the identified points of interest that lie on corners of features within the base field or frame are then selected from the identified points of interest. The points of interest lying on corners are identified by examining the image value of neighboring connected pixels and selecting a point of interest having a smaller number of neighboring connected pixels having a similar image value and a larger number of neighboring connected pixels having a different image value than that point of interest. Additionally, in another exemplary embodiment of the systems and methods of this invention, the selected points of interest are then selected so that the selected points of interest are spaced from each other by a predetermined minimum distance.

In one exemplary embodiment of the systems and methods of this invention, the motion of each selected point of interest is determined by first matching a block of pixels surrounding each of the selected points of interest in the later of two sequential video frames or fields with blocks of pixels at various positions in the former of the two sequential video frames or fields. The block of pixels that provides the minimum difference in intensities between the sequential video frames is determined. The motion is determined from the distance between the position of the block of pixels in the latter field or frame and the determined block of pixels in the former field or frame.

In another exemplary embodiment of the systems and methods of this invention, selecting the desired points of interest from among the identified points of interest includes adding a vector having N times the magnitude of the motion of an identified point of interest, where N is about 2, to the final position of the identified point of interest, and then determining whether the resulting point of interest falls within the region of motion. If the resulting point of interest does not fall within the region of motion, then the identified point of interest to which the vector was added is selected as a point of interest.

Lines representing the motion of the selected points are added to the latter field or frame. The added lines extend from the selected points of interest in the direction of the motion. The added lines have a direction and a length that represents the motion of the corresponding point of interest. Alternatively, these lines extend in a direction that is an average direction of the motion of all of the selected points. In this case, the length of each of the lines is proportional to the motion of its corresponding selected point.

The motion line adding systems and methods according to this invention produce a still image that includes a representation of the motion, between a plurality of fields or frames, of features within the field or frame. The motion is determined from a sequence of two or more video fields or frames that include the still image. In one exemplary embodiment, the motion line adding system includes a memory that stores captured and digitized fields or frames of an image that includes movement. A global motion system eliminates global motion between any two consecutive video fields or video frames. A candidate point determining circuit determines candidate points within a global-motion-compensated base field or frame stored in the memory. A motion determining circuit estimates motion occurring at the candidate points. A candidate point selector extracts selected points from the candidate points. A motion indicating circuit adds motion indicators to the still image at the selected points.

In another exemplary embodiment of the systems and methods of this invention, the motion mask can be generated by comparing two fields or frames without first adjusting for global motion between the two fields or frames. Thus, the motion mask is generated by comparing the uncompensated intensity values at the points of interest between the two fields or frames. In this case, the motion lines will indicate both the local and global motion between the two fields or frames.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
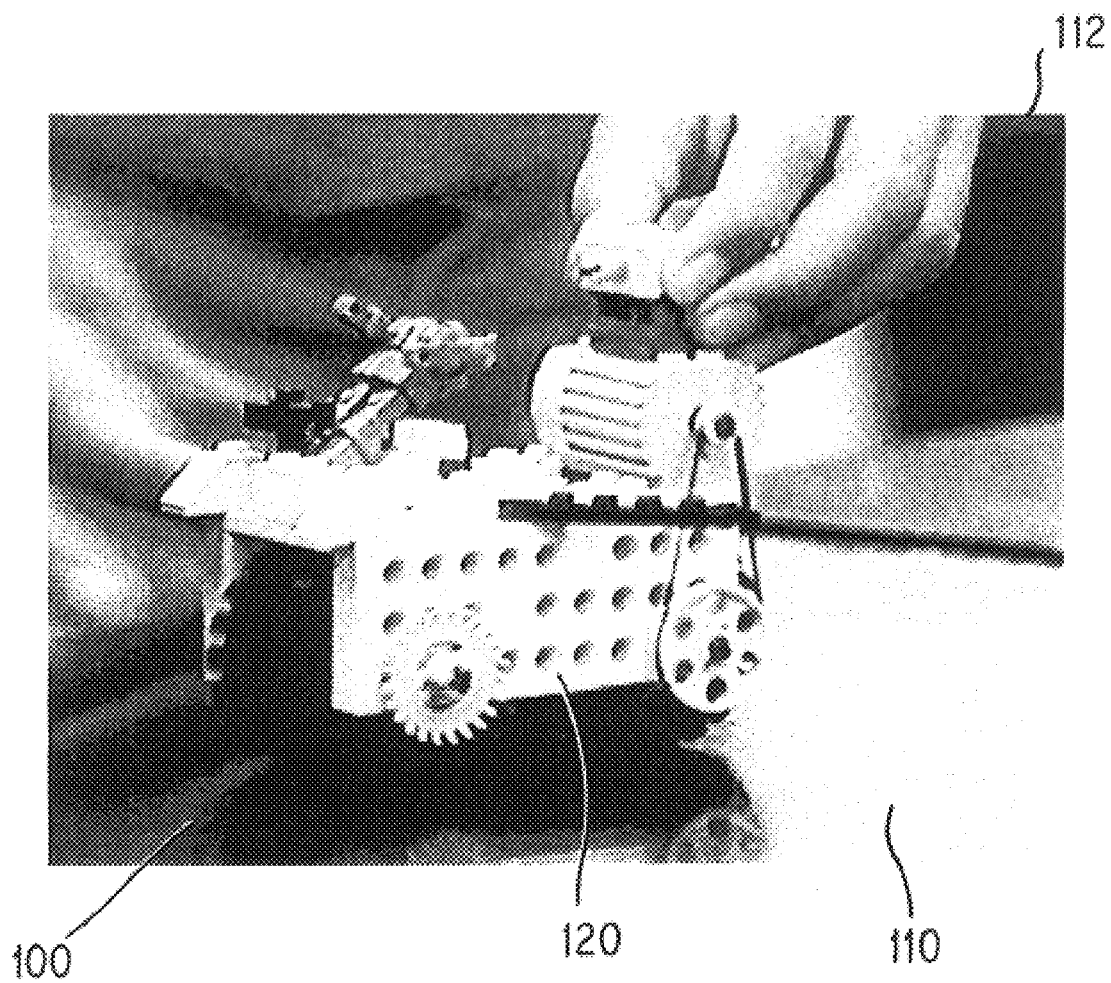
FIG. 1 shows a base still image to which motion lines will be added using the systems and methods according to this invention.

FIG. 1 shows an exemplary captured video frame 100 having a background 110 and a foreground object 120 that is moving relative to the background 110. In particular, the moving object 120 is moving generally towards the lower right hand corner 112 of the video frame.

Figure 2:
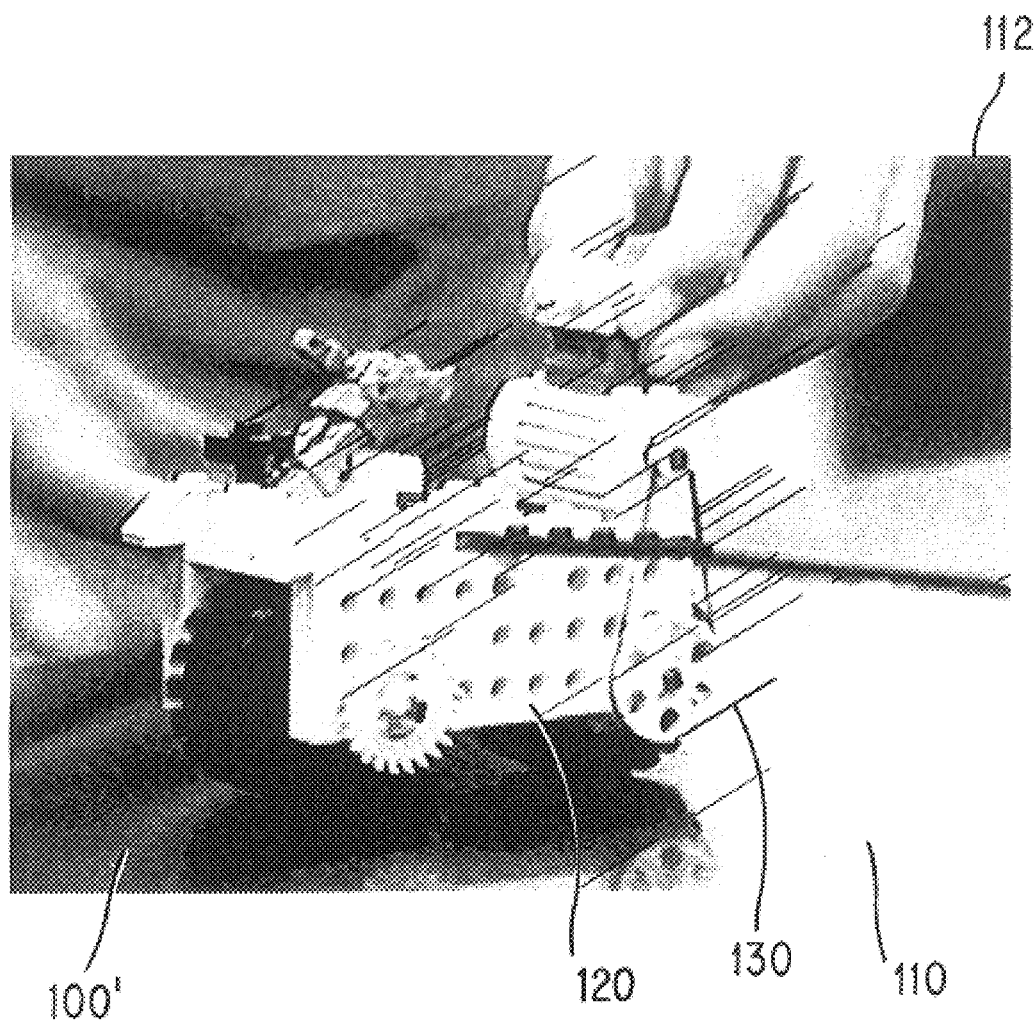
FIG. 2 shows the still image of FIG. 1 with the added motion lines.

FIG. 2 shows an exemplary motion-line-added still image 100' generated from the exemplary still video image 100 shown in FIG. 1. In particular, the motion-line-added still image 100' includes motion lines 130. These motion lines 130 indicate the direction and amplitude of motion of the object 120 relative to the background 110 within the still video image 100 relative to the preceding fields or frames of the video data signal from which the still video image 100 was captured. The motion lines 130 extend parallel to the direction of motion, i.e., towards the upper right hand corner 112 of the still video image 100', from selected pixels of the moving object 120.

In particular, the motion lines 130 are proportional to the amount of motion of the moving object 120 from its position in the field(s) or frame(s) used to form the captured still video image 100 relative to the position of the moving object 120 in one or more immediately preceding field or frames. One or more of these immediately preceding fields or frames also may have been used to form the captured still video image 100, but they need not be so used to form the captured still video image 100.

To more accurately represent the direction of motion, the selected pixels of the moving object 120 within the motion-line-added still video image 100', from which the motion lines 130 extend, are generally on trailing edges of the moving object 120 relative to the direction of motion. Thus, as is conventional in, for example, animated cartoons, the motion lines extend from where the moving object 120 currently is, in the captured motion-line-added still video image 100', back towards the position occupied by the moving object 120 in previous fields or frames of the video data signal from which the still video image 100 was captured.

As shown in FIG. 2, the motion lines 130 are straight lines extending parallel to the direction of the motion of the moving object 120 relative to the previous fields or frame of the video. However, the motion of the moving object 120 can be determined over several fields or frames of the video data signal prior to the fields or frame used to form the captured still video image 100. The motion of each of the various selected pixels of the moving object 120 to which the motion lines 130 will be attached can be plotted and the shape of the motion lines 130 can be fitted to the various plotted motions of the selected points over the several video fields or frames.

In general, the individual motion lines 130 for any one of the selected points of the moving object 120 can be drawn independently of the motion lines 130 for the other selected points. Alternatively, all the selected points of the moving object 120 can be given the same average direction and degree of motion. Moreover, the motion lines 130 connected to the selected points of the moving object 120 can be provided with the same average direction, but the length of the motion lines 130 can be modified to proportionally represent the particular degree of motion of the corresponding points on the moving object 120. Furthermore, it should be appreciated that the lengths of the motion lines 130 can correspond exactly to the amount of motion between the fields or frames used to form captured still video image 100 and the immediately one or more previous fields or frames of the video data signal used to determine the motion of the moving object 120. Alternatively, the length of the motion lines 130 can be multiplied by some selected constant to scale the motion so that the motion is more obvious.

It should further be appreciated that each of the motion lines 130 can be colored the same color, such as black, or can be color-encoded in various ways. One method for color encoding the motion lines can be coloring the motion lines based on the color of the selected pixel of the moving object 120 in the captured still video image 100' to which each motion line 130 is attached. Alternatively, the motion lines 130 can be color-encoded according to the relative amount of motion between the various selected points; according to an amount of difference between the average amount of motion and the amount of motion of each selected point; according to an amount of difference between the average direction of motion and the direction of motion of each selected point, or the like. Accordingly, it should be appreciated that any known or later-developed method for plotting the motion lines 130 and/or for color encoding the motion lines 130 can be used with the systems and methods according to this invention without departing from the scope of this invention.

Figure 3:
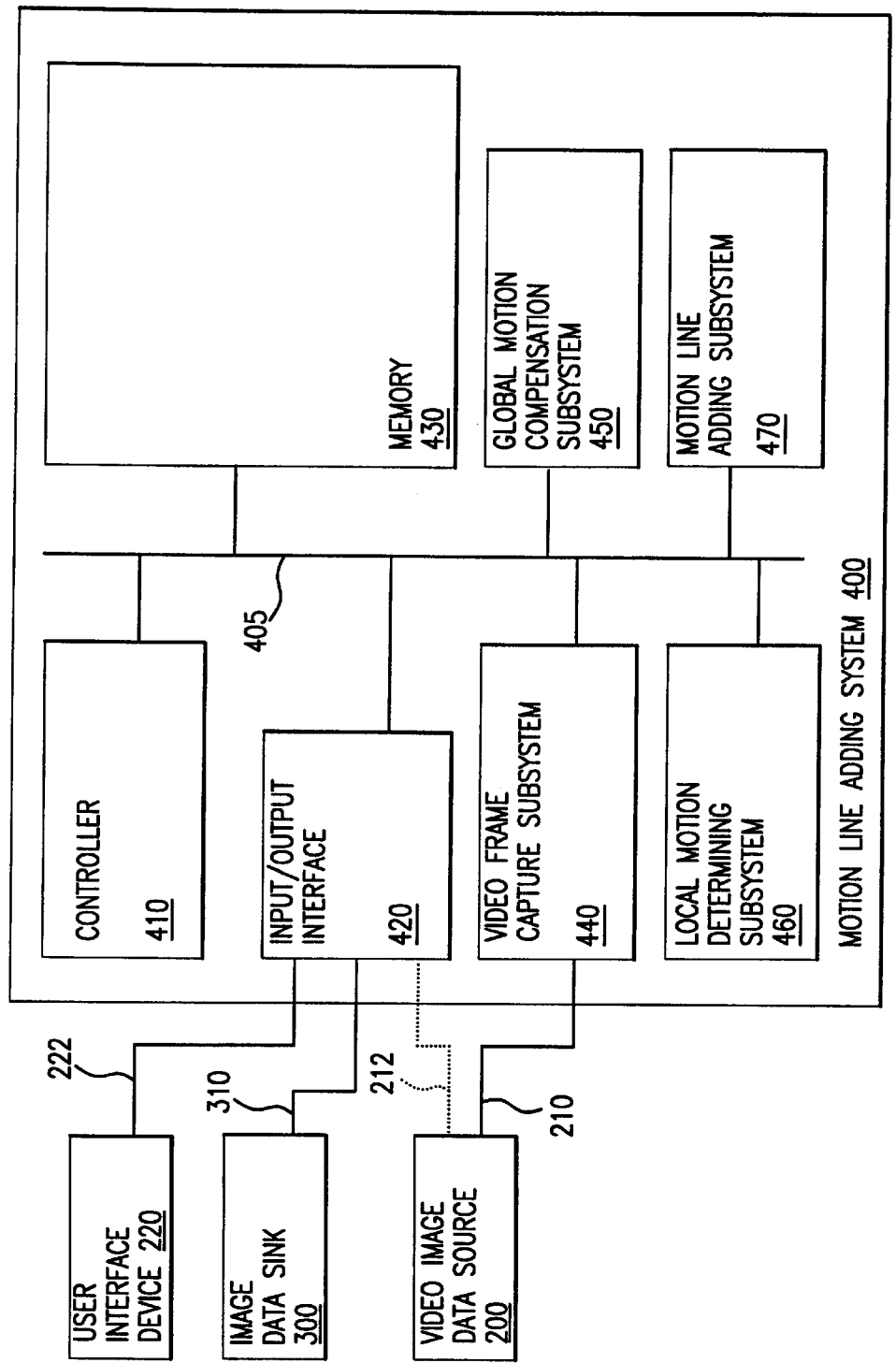
FIG. 3 is a block diagram outlining one exemplary embodiment of a motion line adding system according to this invention.

FIG. 3 is a functional block diagram of one exemplary embodiment of a motion line adding system 400 according to this invention. The motion line adding system 400 automatically adds motion lines to objects and/or to background features in a still image captured from a video data signal or the like, to represent motion between one or more of the objects and the background features in the still image.

As shown in FIG. 3, a user interface 220 and a still image sink 300 are connected to an input/output interface 410 of the motion line adding system 400. A video image data source 200 is also connected to the motion line adding system 400. In particular, the video image data source 200 can be connected over an analog data link 210 to a video frame capture subsystem 440 of the motion line adding system 400. Alternatively to, or in addition to, the analog link 210, the video image data source 200 can be connected over a digital link 212 to the input/output interface 420 of the motion line adding system 400.

The video image data source 200 can be any source of video image data, such as a video cassette recorder or playback device, a video tape recorder or playback device, a video camera, a television camera or a broadcast television signal, a connection to a community antenna television system (i.e., cable TV), a satellite dish receiving satellite television transmissions, a connection to a local or wide area network, an intranet, the Internet or any other described processing network, or any other known or later-developed source of video data signals. In any of these cases, the video image data source 200 is connected to the motion line adding system 400 over the link 210 and/or the link 212.

It should be appreciated that the video image data source 200 can provide either analog video image data, digital video image data, or both. When the video image data source 200 provides analog video image data, the video image data source 200 could be an analog video camera, an analog electronic camera, a television antenna receiving analog television signals, or any other known or later-developed source of analog video data signals. In this case, it should be appreciated that the analog video image data output by the video image data source 200 is output over the analog link 210 to the video frame capture subsystem 440, as will be described in more detail below.

When the video image data source 200 provides digital video image data, the video image data source 200 could be a digital video camera, a digital electronic camera, a digital television camera, a television antenna receiving digital television signals, or a node of a distributed processing network capable of supplying digital video data or any other known or later-developed source of digital video data signals. For example, the video image data source 200 could be a remotely located node of a distributed processing network, such as a local area network, a wide area network, an intranet, the Internet or any other known or later-developed distributed processing network.

When the video image data source 200 supplies digital video image data to the motion line adding system 400, the individual fields and frames of the digital video image data are already in digital form, and thus do not need to be digitized by the video frame capture subsystem 440. Thus, the digital video image data can be directly output by the video image data source 200 over the digital video image data link 212 to the input/output interface 420. It should further be appreciated that the links 210 and/or 212 each could be either a wired or wireless link to the video image data source 200.

Regardless of the particular implementation of the video image data source 200 and the links 210 and/or 212, the motion line adding system 400 receives a video data signal from the video image data source 200 over one of the links 210 and 212. This video data signal comprises at least two fields or frames of the same scene, and can include any number of fields or frames of the same scene. In one exemplary embodiment of the systems and methods according to this invention, the video data signal output by the video image data source 200 to the motion line adding system 400 includes at least two sequential fields or at least two sequential frames. However, the fields or frames of the video data signal output by the video image data source 200 fields to the motion line adding system 400 need not necessarily be sequential, so long as there are at least two fields or frames of the same scene.

As fully described in the incorporated 115 patent, a single video frame conventionally includes two sequential video fields that are offset in time by $\frac{1}{60}^{th}$ of a second. In particular, one of the fields of that frame contains the odd lines of that frame, while the other field contains the even lines of that frame. When that frame is displayed or printed, the even and odd lines of the two fields must be interlaced to form the full frame. As set forth in the 115 patent, because the even and odd fields are offset by $\frac{1}{60}^{th}$ of a second, to form an acceptable captured still image of the frame formed by the even and odd fields, the global motion and the local motion occurring between these two fields should be eliminated when forming the captured video frame.

In particular, when there is local motion occurring between the even and odd fields of a frame, that motion can be detected and can be removed using the systems and methods disclosed in the 115 patent. In contrast, the systems and methods of this invention can use the local motion between two fields of a single frame, or between one of the fields of one frame and one of the fields of a preceding or subsequent frame, to identify the degree and direction of motion of selected points of a moving foreground object according to this invention, before removing the global and local motion between the two fields forming the frame that will become the captured still image.

Alternatively, the systems and methods of this invention could determine the local motion of the foreground objects between a current frame and a preceding frame after the two fields forming each of those frames are combined and the global motion, and possibly the local motion, between those two fields of each of those frames is eliminated using the systems and methods disclosed in the 115 patent. Therefore, the following discussion will refer both to fields and frames.

It should also be appreciated that the motion represented by the motion lines could additionally or alternatively represent the motion of the background relative to one or more relatively fixed, or generally slow moving, foreground objects. In this case, the selected points from which the motion lines will extend can be points on the one or more foreground objects, as described above, points on one or more features of the moving background, or both. While this should be kept in mind, for simplicity, the following discussion will focus primarily on moving foreground objects.

The still image sink 300 can be any known or later-developed device for displaying, printing or otherwise transmitting and/or storing the motion-line-added base captured video frame. The still image sink 300 can also be any known or later-developed type of display device that can visually display the motion-line-added base captured video frame.

Alternatively, the still image sink 300 can be any known or later-developed image forming device for forming an image of the motion-line-added captured video frame on an image recording medium. In particular, in this case, the still image sink 300 could be a dot matrix printer, a laser printer, an ink jet printer, a thermal printer, a xerographic image forming device of any kind, such as digital copier, or the like.

Finally, the still image sink 300 can be a remotely located host computer or other node of a distributed processing network, such as a local area network, a wide area network, an intranet, the Internet or the like, that can store, display and/or print the motion-line-added base captured video frame. Accordingly, the link 310 can be any known or later-developed device for connecting the motion line adding system 400 to a display device, an image forming device, a remotely located host computer, or a remotely located node of a distributed processing network. In particular, the link 310 can be a wired or wireless link.

The user interface device 220 is connected to the motion line adding system 400 over a link 222. The user interface device 220 can be any known or later-developed system or device that allows a user to provide control signals to the motion line adding system. The link 222 can be any known or later-developed connection system or device, as described above with respect to the links 210 and 310.

When a digital video data signal comprising the two or more fields or frames is input to the motion line adding system 400, it is input through the input/output interface 420 under control of the controller 410 and is transferred over a control and data bus 405 to a memory 430. The digital video data signal comprising the two or more video fields or frames is then input to the video frame capture subsystem 440. In contrast, when an analog video data signal is input to the motion line adding subsystem 400, it is input directly to the video frame capture subsystem 440, where it is converted into a digital video data signal, and possibly stored in the in the memory 430.

The video frame capture subsystem 440 captures at least a base field or a base frame of the digital video data signal to which the motion line adding apparatus 400 will add the motion lines 130 and at least one additional field or at least one additional frame of the video data signal. The at least one additional field or frame shows the same scene as the base captured field or frame and occurs earlier in time in the video data signal compared to the base captured field or frame.

In particular, as set forth above, the additional video fields or frames captured by the video capture subsystem 440 can occur sequentially before the at least one field of the base captured video frame. However, it is not strictly necessary that the additional captured video fields or frames occur sequentially immediately before the at least one field of the base captured video frame, so long as the additional captured video fields or frames show the same scene as the at least one field of the base captured video frame.

Once the video frame capture subsystem 400 has captured two or more video fields or frames from the video data signal, the captured video fields or frames are input to a global motion compensation subsystem 450. The global motion compensation subsystem 450 analyzes the captured video fields or frames, and characterizes, and possibly removes, the global motion from the captured video fields or frames. The global motion is that motion between the captured video fields or frames that occurs globally throughout the various foreground and background portions of the video fields or frames. In general, the global motion is due to camera motions such as panning, zooming and the like. It should be appreciated that any known or later-developed systems or methods for removing or compensating for global motion, such as the global motion compensation methods and systems described in the incorporated 115 application, can be used to characterize and remove the global motion from the captured video fields or frames.

Once the global motion from the captured video fields or frames has been characterized, and possibly removed or compensated for, the captured video fields or frames are output to a motion determining subsystem 460. The motion determining subsystem 460 identifies one or more regions of local motion between the base captured video field or frame and the one or more additional captured video fields or frames. In general, in a region of the captured fields or frames in which there is no local motion between the captured video fields or frames, such regions will appear the same in the two or more video fields or frames and their differences will be small. In contrast, in regions in which local motion occurs between the captured video fields or frames, the image will change from field to field, or from frame to frame, and this larger difference can be detected. It should be appreciated that any known or later-developed method for identifying regions of local motion between the captured video fields or frames, such as the local motion compensation methods and systems described in the incorporated 115 patent, can be used with the systems and methods according to this invention.

In particular, in one exemplary embodiment of the motion determining subsystem 460 according to this invention, the local motion of foreground objects between the captured video fields or frames can be detected by determining the pixel-to-pixel difference, after compensating for any global motion, of the base captured video field or frame relative to the additional captured video fields or frames. This pixel-to-pixel difference can then be compared to a predetermined threshold to determine whether the difference, for each pixel of the base captured video field or frame relative to the corresponding pixels of the additional video fields or frames, is sufficiently high enough to be considered local motion.

Once the regions of local motion in the base captured video field or frame are identified, the base captured video field or frame and the local motion information is provided to a motion line adding subsystem 470. The motion line adding subsystem 470 selects a number of points within each region of local motion and adds a motion line to each such point. It should be appreciated that any known or later-developed method for selecting the pixels of the base captured video field or frame within the regions of local motion can be used by the line motion adding subsystem 470 according to this invention.

Once the particular pixels within the regions of local motion of the base captured field or frame are selected, the motion line adding subsystem 470 adds motion lines to the base captured video frame, or the captured video frame that includes the base captured video field. The motion lines extend from the selected pixels. These motion lines extend generally in parallel to the direction of local motion of each such region of local motion. In addition, the length of the lines added by the motion line adding system 470 corresponds to the amount of local motion between the selected pixel and the corresponding portion of the region of local motion in the additional captured video fields or frames.

It should be appreciated that the direction, shape and length of the motion lines added by the motion line adding system 470 can be determined using any known or later-developed method. For example, the direction for each selected point in the regions of local motion can be determined based on the direction of motion for that pixel. Alternately, all of the motion lines connected to the various points within each distinct region of local motion can be given a direction corresponding to the average direction for all of the points of that distinct region of local motion.

Similarly, the length of each motion line can be determined based on the degree of motion of the pixel to which it is attached. Alternatively, the lengths of all of the motion lines attached to the pixels of each distinct region of local motion can correspond to the average degree of motion for that particular region of local motion. It should also be appreciated that, regardless of whether the length and/or direction of a particular motion line is determined based solely on the degree and/or direction of motion of the pixel to which it is attached or some function of all of the pixels of the particular region of local motion to which that motion line is attached, the appearance of that line can be changed based on the actual degree and/or direction of motion of the pixel to which that motion line is attached. The appearance of the motion line can include it color, its thickness, its image density and the like.

It should also be appreciated that other mathematical functions can be used in place of a simple averaging. For example, the length or direction of the motion lines for all the selected points of a particular region of local motion can be based on the largest or smallest absolute value, a highest or lowest frequency value, a median value, or any other known or later-developed statistical parameter. It should also be appreciated that the appearance of the line extending from a particular selected pixel can be determined based on some appearance value of that pixel, a degree of departure of the underlying data value for that particular pixel relative to the particular data values used to determine the direction or length of the motion line or the like.

The base captured video frame with the motion lines added to it is then stored in the memory 430. That motion-line-added base captured video frame is then output by the input/output interface 410 under control of the controller 420 to the still image sink 300 over the link 310.

As indicated above, the systems and methods of this invention are not limited to adding motion lines that indicate only the local motion. Thus, in more general terms, once the global motion compensation subsystem 450 has characterized the global motion, if any, between the two or more fields or frames, the motion determining subsystem 460 will more generally identify one or more regions of motion, whether global or local, between the base captured video or frame and the one or more additional captured video fields or frames. In general, in a region of the captured fields or frames in which there is no motion between the captured video fields or frames, such regions will appear the same in the two or more video fields or frames and the differences will be small. In contrast, in regions in which motion occurs between the captured video fields or frames, the image will change from field to field, or from frame to frame, and this larger difference can be detected, as described above.

Subsequently, once the regions of motion in the base captured video field or frame are identified, the base captured video field or frame and the motion information is provided to the motion line adding subsystem for adding the motion lines, and the motion lines are added, as described above.

Thus, in general, the global motion compensation subsystem 450 and the local motion determining subsystem 460 more generally characterize the motion between the base video field or frame and the one or more additional video fields or frames. The motion line adding subsystem 470 then adds motion lines to the base video field or frame based on the motion between the base and the one or more additional video fields or frames characterized by the global motion compensating subsystem 450 and the local motion determining subsystem 460.

Figure 4:
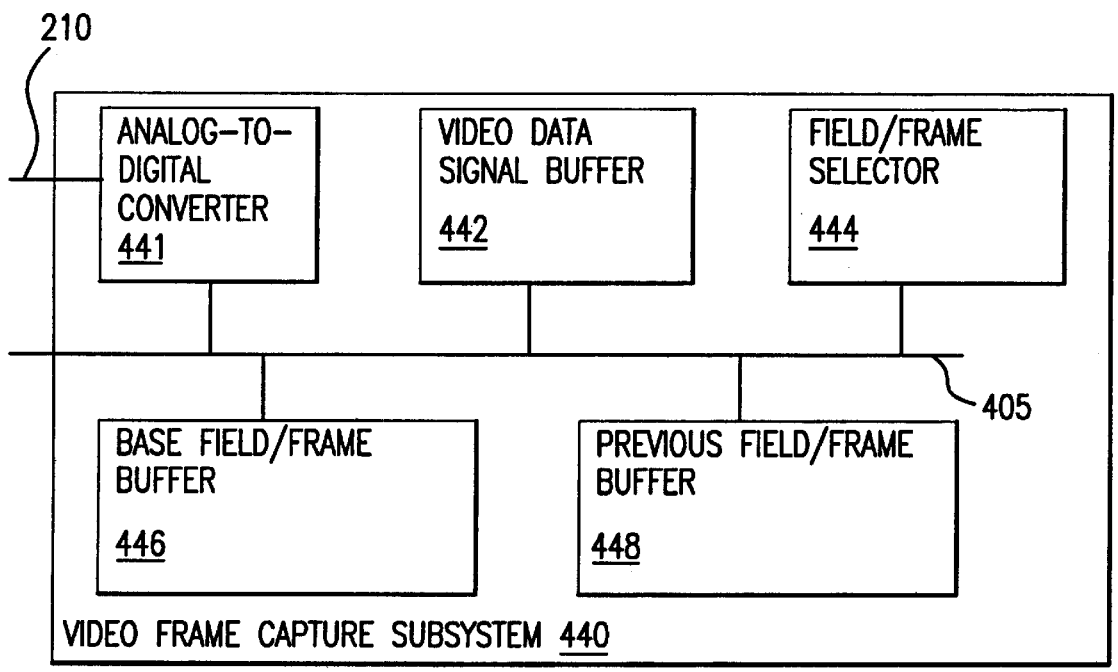
FIG. 4 is a block diagram outlining in greater detail one exemplary embodiment of the video frame capture subsystem of FIG. 3.

FIG. 4 shows a block diagram outlining in greater detail one exemplary embodiment of the video frame capture subsystem 440 shown in FIG. 3. As shown in FIG. 4, this exemplary embodiment of the video frame capture subsystem 440 includes an analog-to-digital converter, or "digitizer", a video data signal buffer 442, a field/frame selector 444, a base field/frame buffer 446 and a previous field/frame buffer 448. As the video image data source 200 supplies video image data to the motion line adding system 400, the motion line adding system 400 receives a signal from the video image data source 200 over one of the links 210 or 212, or a signal from a user from the user interface device 220 over the link 222, indicating that a field or frame currently being received is to he captured by the video frame capture subsystem 440.

In response, the video frame capture subsystem 440, under control of the controller 410, captures that indicated field or frame in the previous field/frame buffer 448. As the motion line adding system 400 receives additional signals indicating that currently received fields or frames should be captured, the video frame capture subsystem 440, under control of the controller 410, stores additional captured fields or frames in one of the field/frame buffers 446 or 448.

In particular, when the video image data source 200 supplies analog video image data to the motion line adding system 400, the analog video data is input to the analog-to-digital converter 441 directly over the signal line 210. The analog-to-digital converter 441 digitizes the analog video data signal and outputs a corresponding digital video data signal which can be stored in the previous field/frame buffer 448 and/or the base field/frame buffer 446. It should be appreciated that, depending on the environment in which the motion line adding system 400 will be used, only analog video data signals or only digital video data signals will be provided by the video data signal source 200 to which the motion line adding system 400 is connected. In this case, only one of the links 210 or 212 needs to be provided. In addition, in this case, if only digital video data signals will be provided by the video data signal, source 200, the analog-to-digital converter 441 can be omitted from the video frame capture subsystem 440.

In particular, in one exemplary embodiment, after the first field or frame is stored in the previous field/frame buffer 448, each subsequently captured field or frame is stored in the base field/frame buffer 446. Subsequently to that, as each new field or frame is captured, the field or frame currently stored in the base field/frame buffer 446 is transferred to the previous field/frame buffer 448 and the just-captured field or frame is stored into the base field/frame buffer 446.

It should be appreciated that the base field/frame buffer 446 and the previous field/frame buffer 448 can each store one or more fields or frames. Furthermore, it should be appreciated that the base field/frame buffer 446 and the previous field/frame buffer 448 could be portions of a single buffer, where the base field/frame buffer 446 is merely that portion of such a single buffer that happens to store the most-recently-captured field or frame. Moreover, it should be appreciated that while the video frame capture subsystem 440 includes the base field/frame buffer 446 and the previous field/frame buffer 448, these buffers 446 and 448 can be implemented as dedicated portions of the memory 430.

Whether or not the video data signal output from the video image data source 200 over the signal link 210 or 212 is buffered in the memory 430, the video data signal is input to the video data signal buffer 442 of the video frame capture subsystem 440. The video data signal buffer 442, under control of the controller 410, stores the video data signal until a full field of the currently-received frame of the video data signal, i.e., the even field or the odd field, has been received. The video data signal buffer 442 then outputs that field to either the base field/frame buffer 446 or the previous field/frame buffer 448 under control of the controller 410.

It should be appreciated that the video data signal buffer 442, while forming part of the video frame capture subsystem 440, can be implemented as a dedicated portion of the memory 430.

Once all of the fields or frames to be captured have been captured by the video frame capture subsystem 440, the field/frame selector 444, under control of the controller 410, can select certain ones of the fields or frames stored in the current field/frame buffer 446 and/or the previous field/frame buffer 448 to be output to the global motion compensation subsystem 450, the motion determining subsystem 460 or the motion line adding subsystem 470.

Figure 5:
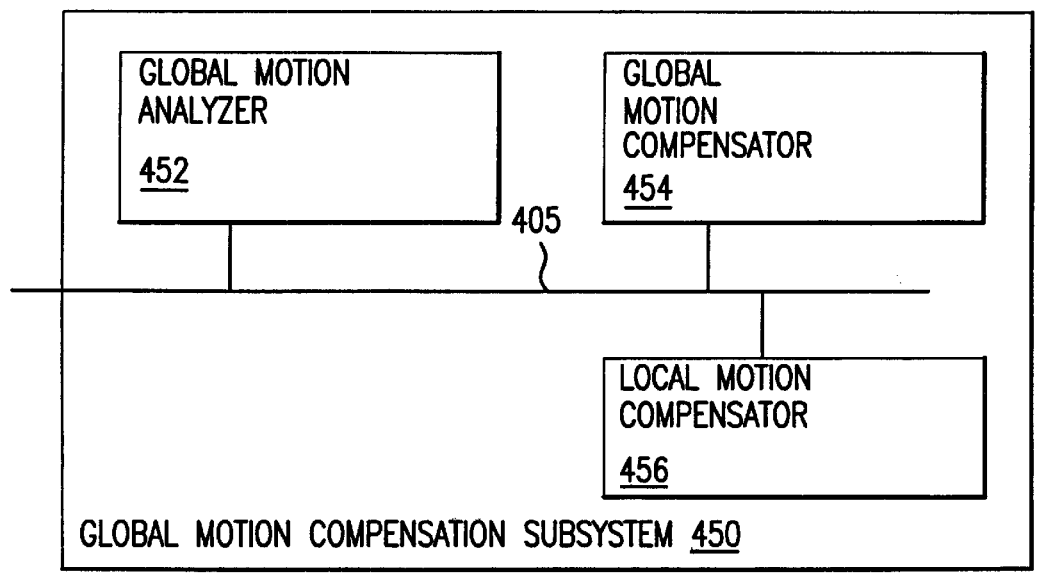
FIG. 5 is a block diagram outlining in greater detail one exemplary embodiment of the global motion compensation subsystem of FIG. 3.

FIG. 5 shows a block diagram outlining in greater detail one exemplary embodiment of the global motion compensation subsystem 450 shown in FIG. 3. As shown in FIG. 5, the global motion compensation subsystem 450 includes a global motion analyzer 452, a global motion compensator 454 and a local motion compensator 456. After the fields or frames to be captured have been captured by the video frame capture subsystem 440, the field/frame selector 444, as set forth above, outputs pairs of uncompensated fields or frames to the global motion compensation subsystem 450 under control of the controller 410. In particular, the pairs of relatively uncompensated fields or frames of the video data signal are input by the global motion analyzer 452. The global motion analyzer 452 compares the two input fields or frames to determine a set of values that represent the global deformation in the image between the two input fields or frames.

In one exemplary embodiment, the values defining the global deformation between the two captured images is a set of affine parameters. In particular, these affine parameters can be determined as set forth in the incorporated 115 patent and/or in U.S. Pat. Application Ser. No. 09/239,296, filed Jan. 29, 1999 and incorporated herein by reference. However, it should be appreciated that any known or later-developed method for characterizing the global and/or local motion between the two fields or frames can be used. As set forth in the incorporated 115 patent and the incorporated 100386 application, the global motion between the two input fields or frames is determined on a pixel-by-pixel basis, or on a block-by-block basis, depending on the degree of motion between the two input fields or frames.

In particular, when the global motion analyzer 452 is determining the global motion between two fields of a single frame, the global motion will generally be determined on a pixel-by-pixel basis, as set forth in the incorporated 115 patent. In contrast, when the global motion analyzer 452 is determining the global motion between two frames, which may not be consecutive, or between a first field of one frame and a second field of another frame, which also may not be consecutive, the amount of global motion may be such that the block-by-block global motion determination systems and methods outlined in the incorporated 100386 application should be used. Moreover, it should be appreciated that the block-by-block analysis collapses into the pixel-by-pixel analysis when the blocks are only a single pixel high and a single pixel wide. It should also be appreciated that any other known or later-developed method for determining the amount of global motion between the two fields or frames can be used by the global motion analyzer 452.

Once the global motion analyzer 452 has determined the amount of relative global motion between the two fields or frames, the one or more values determined by the global motion analyzer 452 that characterizes this global motion are output to the global motion compensator 454. The global motion compensator 454 modifies the image values of one of the two fields or frames based on the set of motion values output by the global motion analyzer. In particular, in one exemplary embodiment, the global motion compensator 454 operates as outlined in the incorporated 115 patent and the incorporated 100386 application. That is, the global motion compensator 454 modifies the image values at each of the pixels in one of the fields or frames so that the pixel values in the modified one of the fields or frames generally aligns with the pixel values in the unmodified one of the fields or frames. In particular, if a portion of the modified field or frame does not correspond to the corresponding region in the unmodified field or frame, then that region is a region of local motion.

It should be appreciated that, if the motion line adding system 400 is to be used to determine the degree and direction of local motion between the two fields of a single frame or between one field of one frame and a second field of another frame, such frames only need to have the global motion removed before being analyzed by the motion determining subsystem 460. In contrast, if the motion line adding system 400 is to add motion lines representative of the local motion between two frames, each of those frames must first be formed by combining the fields forming those frames. Moreover, the global and local motion between the even and odd fields of each of those frames must also be removed and/or compensated for. Accordingly, in this case, the global motion compensation subsystem 450 will also include a local motion compensator 456. The local motion compensator 456 will remove the local motion between the two fields of a single frame as outlined in the incorporated 115 patent. In particular, the local motion compensator 456 can use an edge-adaptive compensation technique as outlined in the 115 patent.

Figure 6:
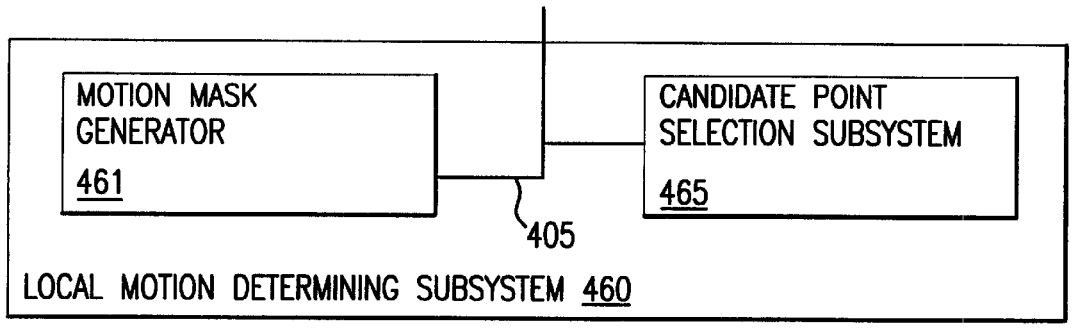
FIG. 6 is a block diagram outlining in greater detail one exemplary embodiment of the motion determining subsystem of FIG. 3 according to this invention.

FIG. 6 shows a block diagram outlining one exemplary embodiment of the motion determining subsystem 460 shown in FIG. 3. As shown in FIG. 6, the motion determining subsystem 460 includes a motion mask generator 461 and a candidate point selection subsystem 465. The motion mask generator 461 compares the global, and possibly local, motion compensated fields or frames generated by the global motion compensation subsystem 450 and generates a motion mask that identifies the regions of motion. The candidate point selection subsystem 465 inputs the motion mask and locates candidate points in the motion regions. The candidate point selection subsystem 465 then generates, for each identified candidate point, an estimate of the motion between the fields or frames. The candidate point selection subsystem 465 then outputs a list of the identified candidate points and the estimated motions to the motion line adding subsystem 470.

Figure 7:
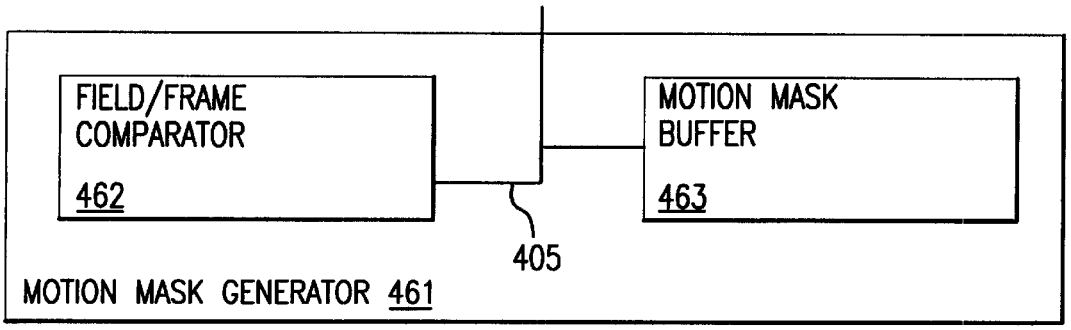
FIG. 7 is a block diagram outlining in greater detail one exemplary embodiment of the motion mask generator of FIG. 6.

FIG. 7 shows a block diagram outlining in greater detail one exemplary embodiment of the motion mask generator 461. As shown in FIG. 7, the motion mask generator 461 includes a field/frame comparator 462 and a motion mask buffer 463. The field/frame comparator 462 inputs the fields or frames selected by the selector 444 from the current and previous field/frame buffers 446 and 448 and compares them to determine the areas of local motion. In particular, in one exemplary embodiment of the field/frame comparator 462, the field/frame comparator 462 obtains a difference in image values between each pixel of the current field or frame and each corresponding pixel of the previous field or frame on a pixel-by-pixel basis.

The field/frame comparator 462 then applies a threshold to the differences between each set of corresponding pixels to determine the areas having differences greater than the threshold. That is, regions of the image where there is no motion will appear the same in the two fields or frames and the difference will therefore be small. However, in regions of motion, the image will change significantly on a pixel-to-pixel basis between the two fields or two frames. This larger difference can be detected by selecting an appropriate threshold value. The result of thresholding the frame difference provides a binary mask indicating where motion takes place in the current field or frame. That is, where the difference is greater than the threshold, the output of the thresholding performed by the field/frame comparator will be a logical one, while in the regions without motion, the result of thresholding performed by the field/frame comparator will be a logical zero.

It should be appreciated that, while the binary mask generated by the field/frame comparator 462 indicates regions where the difference between the current field or frame and the previous field or frame is significant, thus indicating motion within the field or frame, the binary mask does not provide any indication of the degree or direction of the motion. Moreover, the binary mask does not distinguish between a foreground object that moves to cover the background, a background object moving to emerge from behind a stationary foreground object, changes in the position of a foreground object against a moving background, or portions of a foreground object moving relative to each other.

The differences between the fields or frames can be due to noise in the video data signal. Any known or later-developed method or methods can be used to reduce or eliminate this noise. Accordingly, the field/frame comparator 462 can also low-pass filter the fields or frames to blur each of the fields or frames before comparing them to obtain the motion mask. The field/frame comparator 462 can also apply a median filter or apply a morphological dilate or a morphological close to the resulting motion mask. Once the field/frame comparator 462 has generated the motion mask, the motion mask is stored in the motion mask buffer 463.

Figure 8:
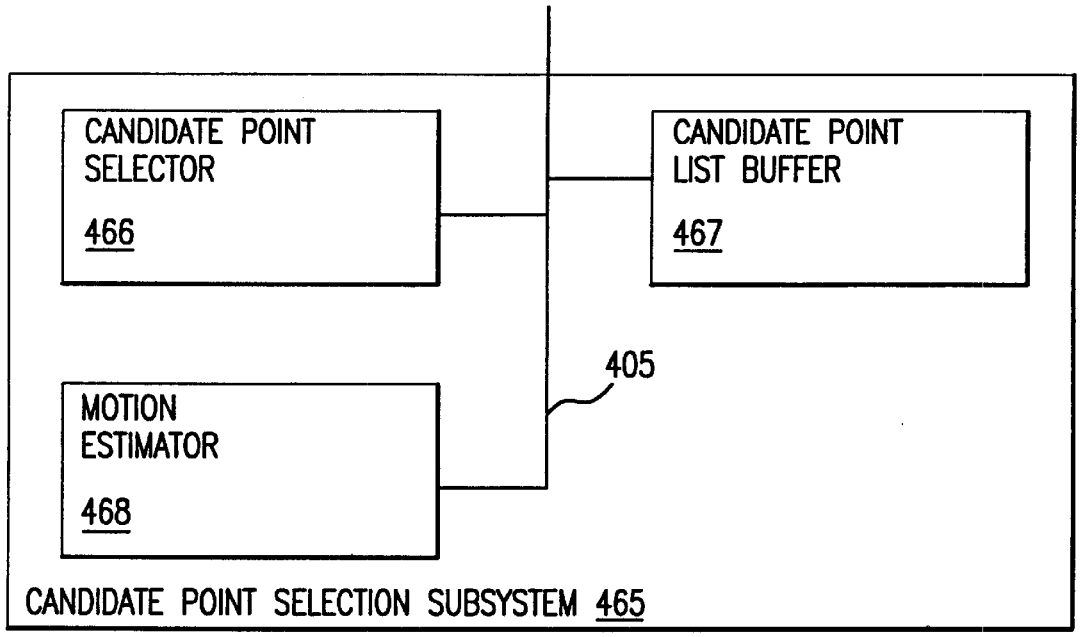
FIG. 8 is a block diagram outlining in greater detail on exemplary embodiment of the candidate point selection subsystem of FIG. 6.

FIG. 8 shows a block diagram outlining in greater detail one exemplary embodiment of the candidate point selection subsystem 465. As shown in FIG. 8, the candidate point selection subsystem 465 includes a candidate point selector 466, a candidate point list buffer 467 and a motion estimator 468. In particular, the motion mask generated by the field/frame comparator 462 and stored in the motion mask buffer 463 is input to the candidate point selector 466. In particular, the candidate point selector 466, based on the motion mask generated by the field/frame comparator 462, searches for candidate points within the motion regions.

In particular, in one exemplary embodiment, the candidate point selector 466 looks for points lying on edges within the motion regions. Any known or later-developed method for finding such edges can be used. There are numerous well-known methods in the art for finding edges. One such method comprises identifying gradients in the pixel values of the pixels within the motion regions that have a magnitude that is both greater than some threshold and greater than the neighboring gradients.

Once the candidate point selector 466 has generated a first list of candidate points, the candidate points are stored in the candidate point list buffer 467. It should be appreciated that not every edge pixel should be selected. This is true for a number of reasons. For example, if every edge pixel was selected, the motion lines would lie immediately adjacent to each other from the edge and thus would tend to obscure the background and fail to provide the motion information they are intended to provide. Thus, the candidate point selector 466 then begins reviewing the candidate points stored in the candidate point list buffer 467 to further identify particular points of interest from the candidate points.

In particular, the more interesting edge pixels are those where the edge forms a corner, or those pixels where the color along the edge changes. The candidate point selector 466 determines which ones of the candid points in the candidate point list lie on such corners or in such color change regions by examining each of the candidate points' eight immediate neighbors. If two or three connected neighbors have essentially the same image value as the candidate point, while the other five or six neighbors have a different image value, then the candidate point selector 466 selects that candidate point as a point of interest. In particular, if the candidate point selector 466 determines that a candidate point is not a point of interest, that candidate point is deleted from the candidate point list stored in the candidate point list buffer 467.

It should further be appreciated that the points of interest should not be too tightly clustered together. Any known or later-developed method for ensuring the points of interest are not too tightly clustered together can be used. There are many possible ways that will be obvious and predictable to those of ordinary skill in the art to ensure the points of interest are not too tightly clustered. In particular, one exemplary method that can be implemented in the candidate point selector 466 includes assigning a cost value to neighboring points of interest on the candidate point list stored in the candidate point list buffer 467. In particular, the cost value decreases based on the distance from the selected point of interest. As each point of interest is selected, the cost value assigned to neighboring points of interest of that selected point of interest will be added to the cost values for those neighboring points of interest resulting from other points of interest being selected. Since the cost is reduced and distributed based on distance, the cost values assigned to an unselected point of interest will be lower the further it is from other selected points of interest. Thus, it will become easier for such a point of interest to be selected.

In particular, as the various ones of the points of interest are selected and the cost value is added to the other points of interest, the cost value assigned to such additional points will be compared to a threshold. If the cost value is above the threshold, that point of interest is deleted from the candidate point list stored in the candidate point list buffer 467 and the cost sums of remaining points of interest are adjusted accordingly to compensate for the cost sum of the deleted point of interest. On the other hand, if the selected point of interest has a cost value that is below the threshold, then that point of interest is selected and additional cost values are distributed to its neighboring points of interest. This continues until all of the points of interest stored in the candidate point list buffer 467 have either been selected or deleted.

It should also be appreciated that the candid point selector 466 can simultaneously apply both the corner selection and the cost value selection at the same time. In this case, as each pixel in the motion region identified by the motion mask stored in the motion mask buffer 463 is selected, based on the corner selection test, the pixels surrounding that selected pixel will be given a cost value that diminishes with distance. Then, before a next pixel within the motion region can be selected as a point of interest, its associated cost value must be below a threshold value.

Once the candidate point list stored in the candidate point list buffer 467 has been thinned so that only the identified points of interest remain, the motion estimator 468 can then determine the motion of each of the identified points of interest. Any known or later-developed method for estimating the motion of the selected points of interest can be used. In particular, in one exemplary embodiment of the motion estimator 468, the motion estimator 468 uses the well-known technique of block matching. In block matching, for each identified point of interest, the motion estimator identifies a region or block of pixels surrounding the identified point of interest in a version of the current field or frame that has been low-pass filtered. The identified region or block of pixels identified by the motion estimator 468 is then compared against corresponding blocks of pixels at various positions in the version of the previous field or frame used by the field/frame comparator 462. The position of the region or the block of pixels in the low-pass filtered previous frame that yields the minimum difference is defined as the location of the point of interest in the previous field or frame. The difference and position between the two fields or frames is the motion of that point of interest on the object.

It should be appreciated that, once the corresponding point in the low-pass filtered previous field or frame has been identified, the motion estimator 468 can cause the field/frame selector 444 to select a further previous frame from the previous field/frame buffer 448. This further previous field or frame can then also be a low-pass filtered and the position of the candidate point of interest in the further field or frame identified in the same manner by the motion estimator 468 to track the motion of the selected point of interest back through time.

It should be appreciated that, while the motion mask buffer 463 and the candidate point list buffer 467 are described as part of the motion determining subsystem 460, that these buffers can actually be implemented as part of the memory 430. Alternatively, they can be independent memory devices or structures.

It should also be appreciated that, if a good block match cannot be found between the current field or frame and the previous field or frame by the motion estimator 468, then that point of interest can be deleted from the candidate point list stored in the candidate point list buffer 466. Similarly, the motion estimator 468 can determine an average motion for all points in the current image. The motion estimator 468 can then determine the difference between the motion for any one of the identified points of interest and the determined average motion. The motion estimator 468 can then delete from the candidate point list stored in the candidate point list buffer 466 any identified point of interest that has a motion value that differs more than a threshold value from the average distance. That is, if the candidate point of interest has a motion value that differs significantly from the average motion value, the motion value for that candidate point of interest can be assumed to be erroneous. It should further be appreciated that the motion estimator 468 can determine a global average for the current field or frame. Alternatively, the motion estimator 468 can determine a local average for each separate region motion within the current field or frame, where that local average is used only for the candidate points of interest within that motion region.

Figure 9:
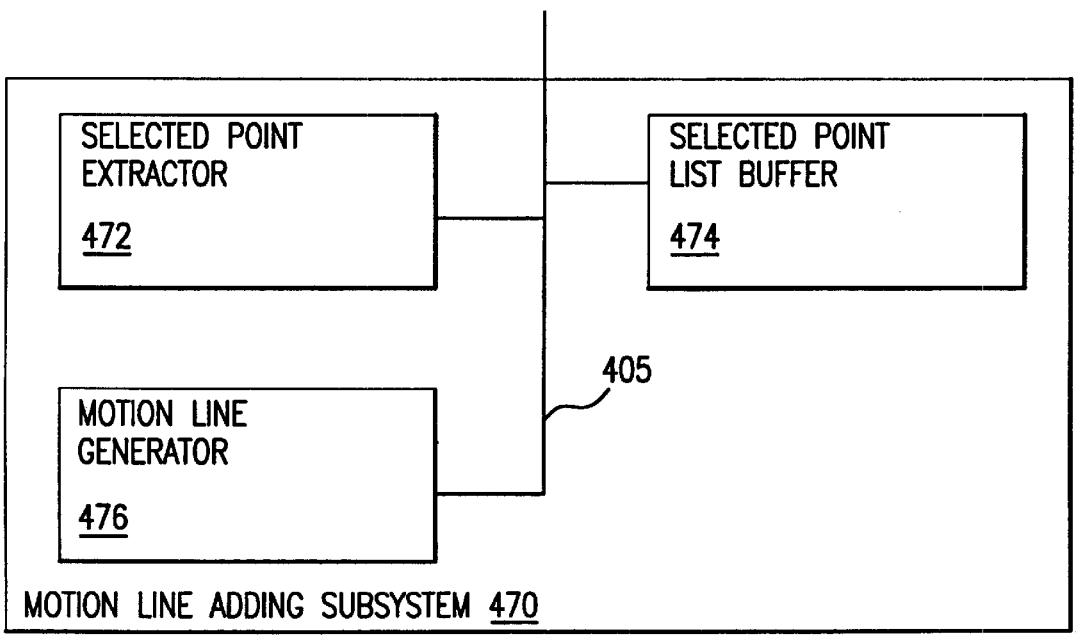
FIG. 9 is a block diagram outlining one exemplary embodiment of the motion line adding subsystem of FIG. 3 according to this invention.

FIG. 9 shows a block diagram outlining in greater detail one exemplary embodiment of the motion line adding subsystem 470 shown in FIG. 3. As shown in FIG. 9, the motion line adding subsystem 470 includes a selected point extractor 472, a selected point list 474 and a motion line generator 476. The selected point extractor 472 selects in turn each point of interest remaining on the candidate point list stored in the candidate point list buffer 467.

The selected point extractor 472 selects each point of interest from a candidate point list buffer 467 to determine whether that candidate point of interest lies on a leading edge or a trailing edge of the region of motion. For example, if the region of motion is a large foreground object that is moving within the captured fields or frames in a particular direction, it would generally be unnecessary or undesirable to add motion lines that extend from the leading edge of that object in the direction of motion, as such motion lines are very like to lie completely within the moving object. Furthermore, even if such lines do not lie completely within the moving object, adding motion lines to the leading edge of the object tends to obscure or otherwise disrupt the structure of the moving object. Finally, because the motion lines are intended to show movement of the points of interest from one or more previous positions to their current positions, the viewer often expects to see such motion lines extending only from the trailing edge of the object or other region of motion.

The selected point extractor 472 inputs, for each selected point from the points remaining in the candidate point list, the motion direction and value determined by the motion estimator 468. The selected point extractor 472 then increases the motion amount to identify a point in the current frame that is farther away from the selected point of interest than the distance between the selected point and the corresponding point in the previous frame. For example, in one exemplary embodiment, the selected point extractor 472 then doubles the motion amount to identify a point in the current frame that is twice as far away from the selected point of interest as the distance between the selected point and the corresponding point in the previous frame. However, it should be appreciated that the motion amount can be increased by adding any offset value to the motion amount, and/or multiplying the motion amount by any real number.

The selected point extractor 472 then examines the motion mask stored in the motion mask buffer 463 to determine the value for the identified point in the motion mask. If the motion mask for that point indicates there is no motion at this point, then the selected point of interest selected by the selected point extractor 472 from the candidate point list stored in the candidate point list buffer 467 is added to the selected point list stored in the selected point list buffer 474. Otherwise, if the motion mask indicates that there is motion at that identified point in the current field or frame, that selected point of interest is discarded.

It should also be appreciated that the selected point list buffer 474 and the candidate point list buffer 467 could be physically the same, identical buffer or set of memory locations. That is, instead of providing an independent selected point list buffer 474, the candidate point list buffer 467 can act as a selected point list buffer 474. In this case, rather than copying the selected point of interest selected by the selected point extractor 472 from the candidate point list stored in the candidate point list buffer 467 to the selected point list buffer 474, the selected point of interest selected by the selected point extractor 472 is instead not deleted from the candidate point list stored in the candidate point list buffer 467. That is, when the motion mask for the selected point of interest indicates that there is motion at the identified point, the selected point of interest selected by the selected point extractor 474 is deleted from the candidate point list stored in the candidate point list buffer 467. Thus, the set of points remaining in the candidate point list buffer 467 is in fact the selected point list and the candidate point list buffer 467 has become the selected point list buffer 474.

Once the selected point extractor 472 has selected and analyzed each of the remaining identified points of interest stored in the candidate point list buffer 467 and stored the remaining selected points of interest in the selected point list buffer 474, the motion line generator 476 then selects each of the selected points of interest. The motion line generator 476 then generates, for each selected point of interest, a motion line to be added to the current field or frame for that selected point of interest. It should be appreciated there are various ways for generating and adding the motion lines to the current field or frame that will be obvious and predictable to those skilled in the art. For example, the motion line generator 476 can generate for each of the selected points of interest, a straight line of motion that extends from that point of interest in the direction of motion back towards the position in the previous field or frame.

Alternatively, if the motion estimator 468 has tracked the motion of each of the selected points of interest back over a number of previous fields or frames, the motion line generator 476 can generate a curved spline that is fit to the various positions that correspond to the selected point of interest in the previous fields or frames. The motion line generator 476 can also generate a different motion line for each selected point of interest based on its motion value. Alternatively, the motion line generator 476 can generate the motion line having a length that corresponds to the average or global motion values, as outlined above.

Similarly, the motion line generator 476 can orient the motion line in the current field or frame according to the determined motion direction for each selected point of interest. Alternatively, the motion line generator 476 can determine an average direction for the selected points of interest, on either a global basis or a local basis, as set forth above. In this case, the lengths of the motion lines for each of the selected points of interest can be scaled to match the motion of the corresponding selected points of interest in the average direction.

It should further be appreciated that the motion line generator 476 can generate the lines so they are exactly as long as the motion value. Alternatively, the motion line generator 476 can scale the motion lines up or down so the motion can be better represented.

It should further be appreciated that the motion line generator 476 can color each line the same color or the color of the selected point of interest from which each motion line extends. Moreover, it should be appreciated that the motion line generator 476 can color encode the motion lines to indicate the departure of each motion line from the average motion value, the average motion direction, or both.

In any case, once the selected point extractor 472 determines the final set of selected points of interest and stores them in the selected point list buffer 474, the motion line generator 476 selects each selected point of interest in turn and adds a motion line, as outlined above, to the current field or frame stored in the current field/frame buffer 446. The added motion line extends in the direction of motion to the pixel of a current frame or field corresponding to the selected point of interest.

The motion-line-added field or frame stored in the current field/frame buffer 446 can then be stored in the memory 430 and/or output through the input output interface 420 under control of the controller 410 to the image data sink 300.

Figure 10:
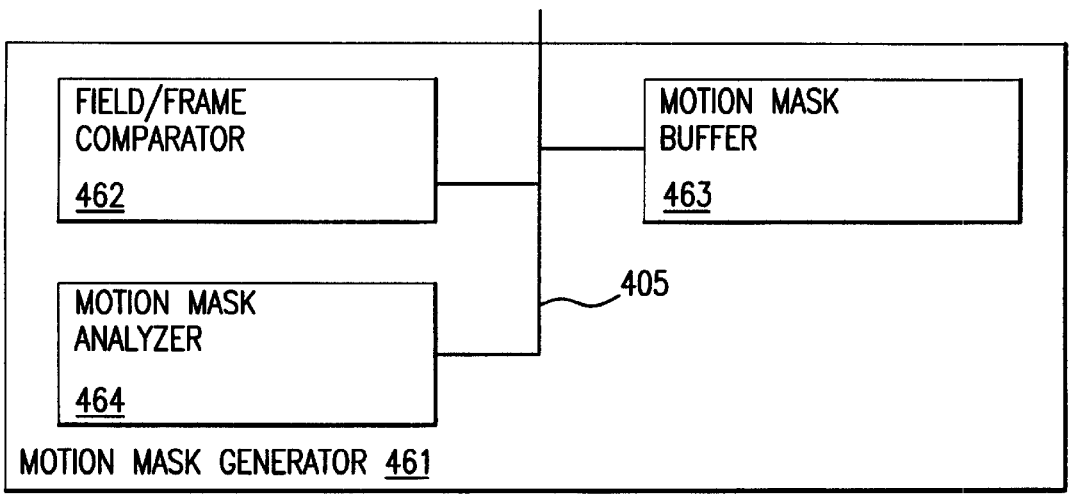
FIG. 10 is a block diagram outlining a second exemplary embodiment of the motion mask generator of FIG. 6.

FIG. 10 is a block diagram outlining a second exemplary embodiment of the motion mask generator 461. As shown in FIG. 10, second exemplary embodiment of the motion mask generator 461 includes a motion mask analyzer 464, as well as the field/frame comparator 462 and the motion mask buffer 463. The motion mask analyzer 464 analyzes the motion mask stored in the motion mask buffer to determine the amount of motion in the global motion compensated fields or frames.

As indicated above, the above-outlined description of the exemplary embodiment of the motion line adding subsystem 400, the global motion compensation subsystem 450 and the local motion determining subsystem 460 are described relative to identifying regions of motion within a base field or frame relative one or more previous fields or frames after removing any global motion between the base and the one or more previous field or frames. However, it should be appreciated that, as indicated above, the motion line adding system 400 can more generally add motion lines based on any type of motion between the base field or frame and the one or more additional previous fields or frames. That is, it may be desirable or necessary to indicate not just the local motion between the base field or frame and the one or more additional previous field or frames, as set forth above, but to indicate instead of, or in addition to, the local motion, the global motion, or more generally, the motion, between features of the base field or frame and the one or more previous fields or frames. In this case, the global motion compensation subsystem 450 and the local motion determining subsystem 460 more generally characterize the motion between the base field or frame and the one or more previous fields or frames. This characterization information is then used by the motion line adding subsystem 470 to add motion lines to various features in the base field or frame.

It should be understood that each of the elements shown in FIGS. 3–10 can be implemented as portions of a suitably programmed general purpose computer. Alternatively, each of the elements shown in FIGS. 3–10 can be implemented as physically distinct hardware circuits within an ASIC, or using a FPGA, a PDL, a PLA, or a PAL, or using discrete logic elements or discrete circuit elements. The particular form each of the elements shown in FIGS. 3–10 will take is a design choice and will be obvious and predictable to those skilled in the art based on the foregoing description.

Figure 11:
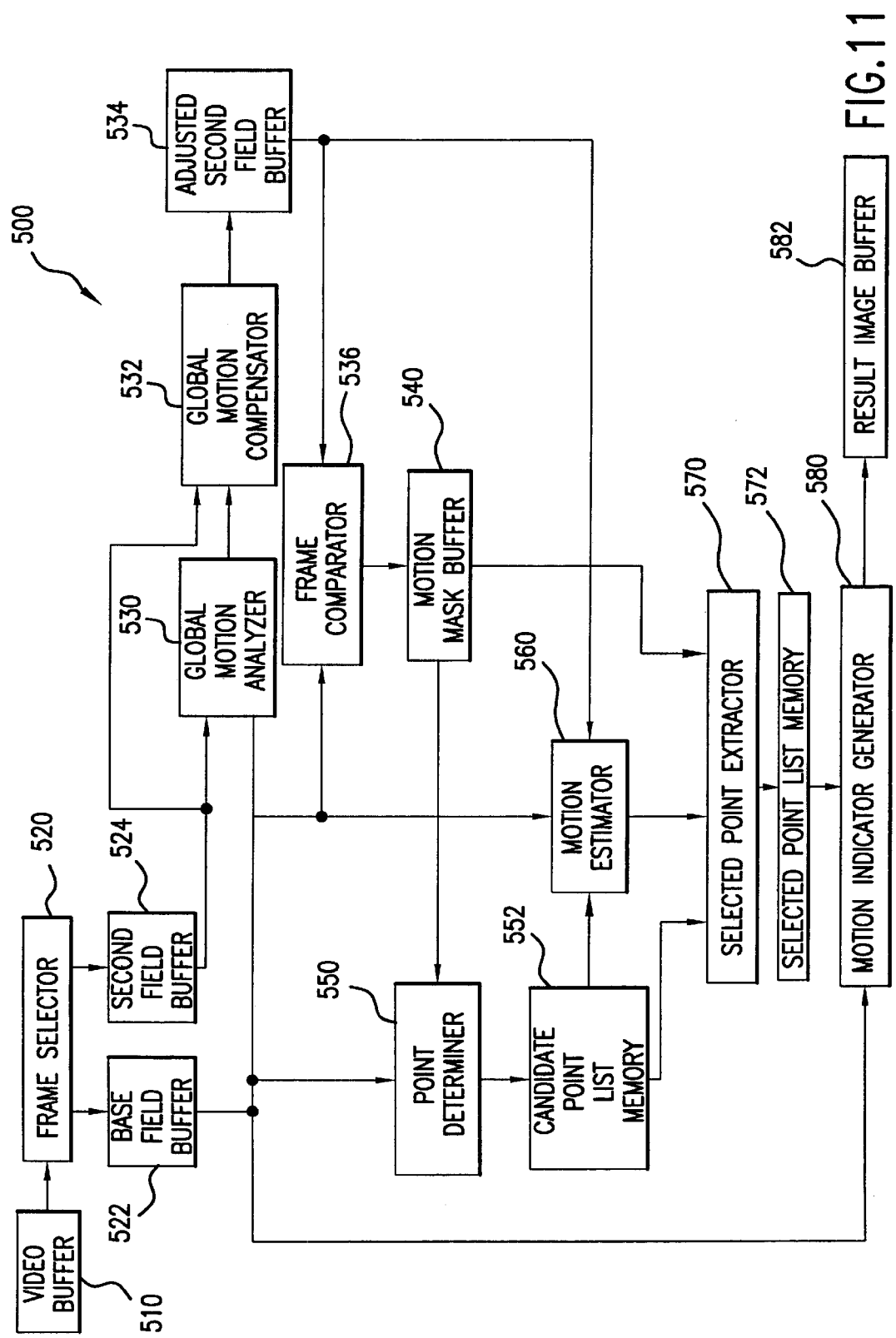
FIG. 11 is a block diagram outlining a second exemplary embodiment of a motion line adding system according to this invention.

FIG. 11 shows a second exemplary embodiment of a motion line adding system 500 according to this invention. As shown in FIG. 11, the video image data is stored in a video buffer 510. A frame selector 520 selects fields or frames of the video image data from the video buffer 510. In particular, the frame selector 520 selects a first or base field from the video data stored in the video buffer and outputs it to a base field buffer 522. Similarly, the frame selector selects a second field from the video data stored in the video buffer 510 and outputs it to a second field buffer 524, where it is stored. The first and second fields stored in the base and second field buffers 522 and 524 are output to a global motion analyzer 530. The global motion analyzer 530 analyzes the first and second fields to identify the global motion between the first and second fields.

The global motion analyzer 530 outputs a set of affine parameters defining the deformation between the first and second fields caused by the global motion to a global motion compensator 532. The global motion compensator 532 inputs the set of affine parameters from the global motion analyzer 530 and the second field stored in the second field buffer 524. The global motion compensator 532 then modifies the pixel values of all of the pixels of the second field based on the set of affine parameters to form an adjusted second field. This adjusted second field is then output by the global motion compensator 532 to an adjusted second field buffer 534 where the adjusted second field is stored.

The first field and the adjusted second field stored in the base field buffer 522 and the adjusted second field buffer 534 are then output to a frame comparator 536. The frame comparator 536 compares the base and adjusted second fields to identify motion regions in the base field. In particular, the frame comparator 536 determines a difference in pixel values for each pair of corresponding pixels in the base and adjusted second fields. The frame comparator 536 then applies a threshold to the difference between the pixel values for the corresponding pixels in the base and adjusted second fields. By applying a threshold, the frame comparator 536 converts the difference into a binary value. In particular, a "1", indicating a value greater than the threshold, indicates motion between the base and adjusted second fields, while a "0", indicating a value less than or equal to the threshold, indicates no motion between the base and adjusted second fields. The binary values are then output by the frame comparator 536 to a motion mask buffer 540, which stores the binary motion values.

The base field is then output by the base field buffer to a point determiner 550, which also inputs the binary motion values from the motion mask buffer 540. The point determiner 550 determines candidate points in the base field based on the binary values stored in the motion mask buffer 540. The point determiner 550 then outputs the determined candidate points to a candidate point list memory 552.

A motion estimator 560 then inputs the base and adjusted second fields from the base field buffer 522 and the adjusted second field buffer 534, as well as the candidate point list stored in the candidate point list memory 552. Based on this data, the motion estimator 560 identifies the amount of motion for each of the candidate points stored in the candidate point list memory between the base and adjusted second fields received from the base and adjusted second field buffers 522 and 534. The motion estimator 560 then outputs the motion values and motion directions determined for the candidate points stored in the candidate point list memory 552 to a selected point extractor 570.

The selected point extractor 570 also inputs the candidate point list stored in the candidate point list memory 552 and the motion mask stored in the motion mask buffer 540. Based on this data, the selected point extractor 570 identifies the selected ones of the candidate points stored in the candidate point list memory 552 and stores the list of selected points in the selected point list memory 572.

The list of selected points stored in the preferred point list memory 572 is then output, along with the base field stored in the base field buffer 522, to a motion indicator generator 580. The motion indicator generator 580 generates a motion line for each point in the list of selected points received from the selected point list memory 572 based on the image data of the base field stored in the base field buffer 522. In particular, the motion indicator generator 580 generates the motion lines using any one of the various techniques outlined above with respect to the motion line generator 476 shown in FIG. 9.

Once the motion indicator generator 580 has generated a motion line for each of the points stored in the selected point list memory 572, the resulting modified base field is output by the motion indicator generator 580 to the result image buffer 582.

As set forth above, the resulting image stored in the result image buffer 582 can either be stored indefinitely or can be output to an image data sink 300 over the link 310.

It should be appreciated that, while the above outlined description of the motion line adding system 500 is directed to two fields stored in the base and second field buffers 522 and 524, the base and second field buffers 522 and 524 can also store full frames of the video image data selected by the frame selector 520 from the video data stored in the video buffer 510. Each of these frames will comprise a pair of deinterlaced fields, as outlined above. Similarly, in this case, the adjusted second field buffer 534 will store a full frame, rather than just the second field. In this case, the two fields forming each of the frames stored in the base and second field buffers 522 and 524 will preferably be generated from the two constituent fields using the global and local motion compensation systems, as outlined above with respect to the 115 patent and the (100386) patent application.

Figure 12:
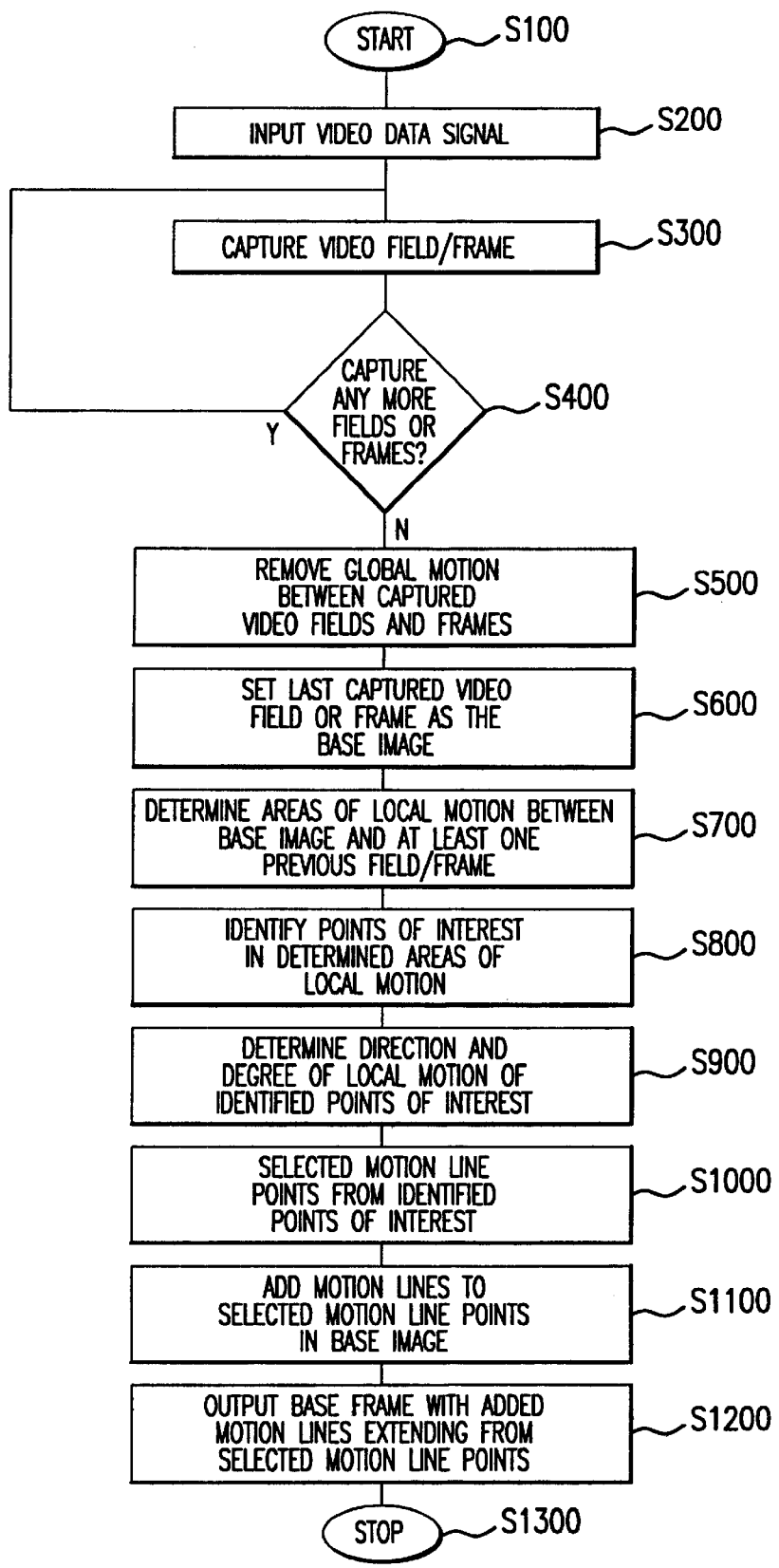
FIG. 12 is a flowchart outlining one exemplary embodiment of a motion line adding method according to this invention.

FIG. 12 outlines one exemplary embodiment of a motion line adding method according to this invention. As shown in FIG. 12, control starts in step S100 and proceeds to step S200. In step S200, a video data signal is input. Then, in step S300, a video field or frame is captured. Next, in step S400, a determination is made whether any more fields or frames need to be captured. If so, control jumps back to step S300. Otherwise, control continues to step S500.

In step S500, any global motion between the fields or frames in a pair of fields or frames is removed, for one or more pairs of the captured video fields and/or frames. Then, in step S600, the last captured video field or frame is set as the current image. Next, in step S700, areas of local motion between the current image and at least one previous image are determined. Control then continues to step S800.

In step S800, the points of interest within the determined areas of local motion are identified. Then, in step S900, the direction and the degree of the local motion of the identified points of interest are determined. Next, in step S1000, selected motion line points are identified from the points of interest. In one exemplary embodiment, the selected motion line points are selected from the identified points of interest based on the degree and the direction of the corresponding local motion of each selected point of interest. Control then continues to step S1100.

In step S1100, motion lines are added to each of the selected motion line points in the current image. In one exemplary embodiment, the motion lines are added to the current frame when the current image is a frame, or to the frame containing the current image when the current image is a field. Next, in step S1200, the current image, e.g., the current frame or the frame containing the current field, is output with the added motion lines extending from the selected motion line points. Control then continues to step S1300, where the control routine ends.

Figure 13:
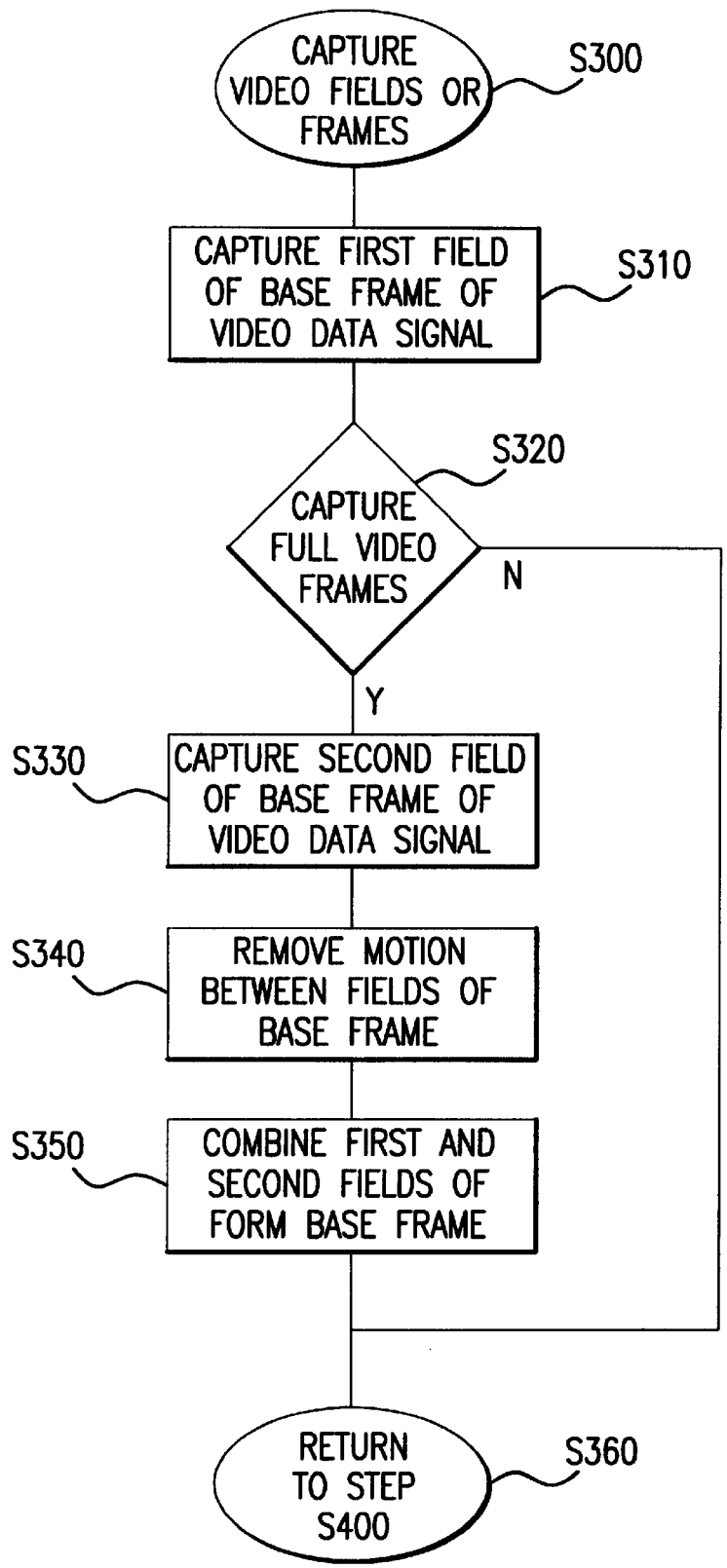
FIG. 13 is a flowchart outlining in greater detail one exemplary embodiment of the current frame comparing method of FIG. 12.

FIG. 13 is a flowchart outlining in greater detail one exemplary embodiment of the video field/frame capture step S300. Beginning in step S300, control continues to step S310, where a first field of a current frame of the video data signal is captured. Then, in step S320, a determination is made whether a full video frame is to be captured. If not, control jumps to step S370. Otherwise, control continues to step S330.

In step S330, the second field of the current frame of the video data signal is captured. Then, in step S340, the motion between the first and second fields of the current frame is removed. Any known or later-developed method or methods for removing the motion between the first and second fields of the current frame can be used. In particular, in one exemplary embodiment, the global motion between the first and second fields of the current frame is first removed, then the local motion between the global-motion-compensated first and second fields of the current frame is removed. Control then continues to step S350.

In step S350, the motion compensated first and second fields are combined to form the current frame. Control then continues to step S360, where control returns to step S400.

Figure 14:
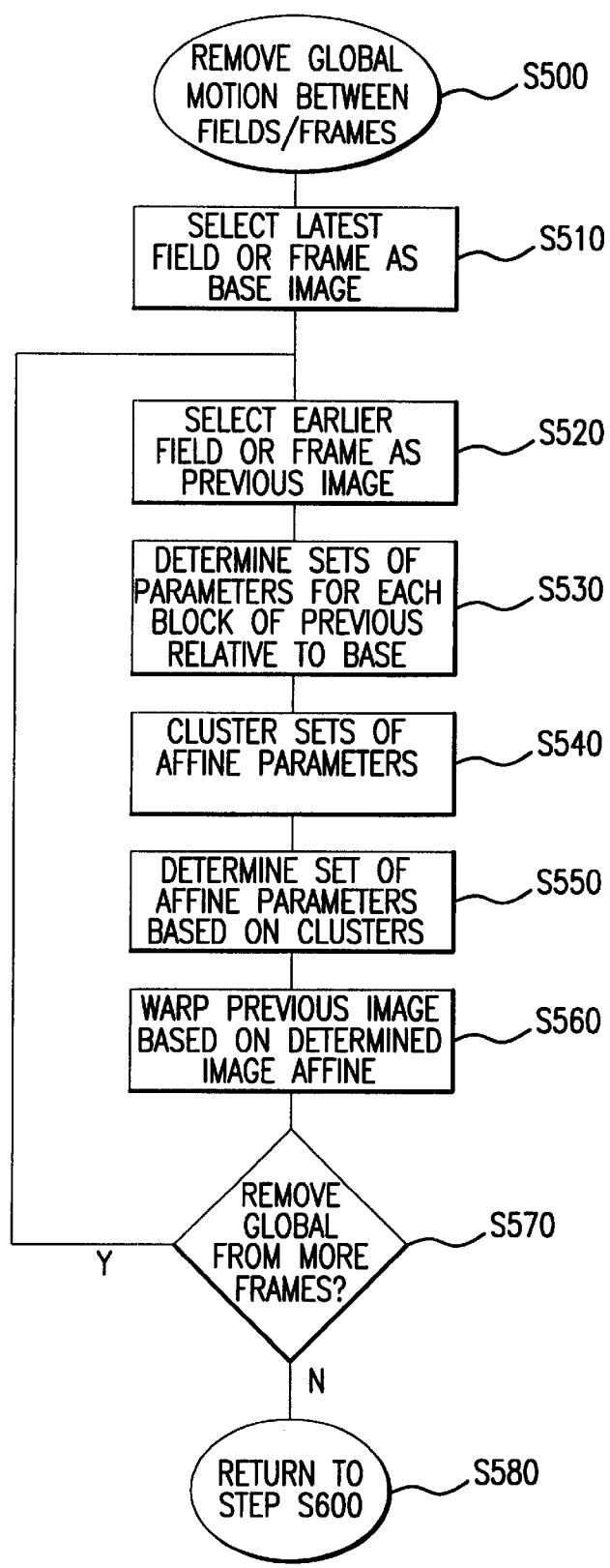
FIG. 14 is a flowchart outlining in greater detail one exemplary embodiment of the points of interest identifying method of FIG. 12 according to this invention.

FIG. 14 is a flowchart outlining in greater detail one exemplary embodiment of the global motion removing step S500. Beginning in step S500, control continues to step S510, where the latest captured field or frame is selected as the current image. Then, in step S520, an earlier captured field or frame is selected as the previous image. Next, in step S530, sets of affine parameters are determined for each pixel or each block of pixels in the previous image relative to the current image. In particular, it should be appreciated that the blocks can be square or rectangular and can extend from one pixel on a side. In particular, a one pixel by one pixel block is equivalent to a pixel. Control then continues to step S540.

In step S540, the sets of affine parameters are clustered. Next, in step S550, a set of image affine parameters is determined based on the clusters of the block affine parameters determined in step S540. Then, in step S560, the previous image is warped based on the determined set of image affine parameters determined in step S550. Control then continues to step S570.

In step S570, a determination is made to whether global motion needs to be removed from additional fields or frames. If so, control jumps back to step S520. Otherwise, control continues to step S580, which returns control to step S600.

Figure 15:
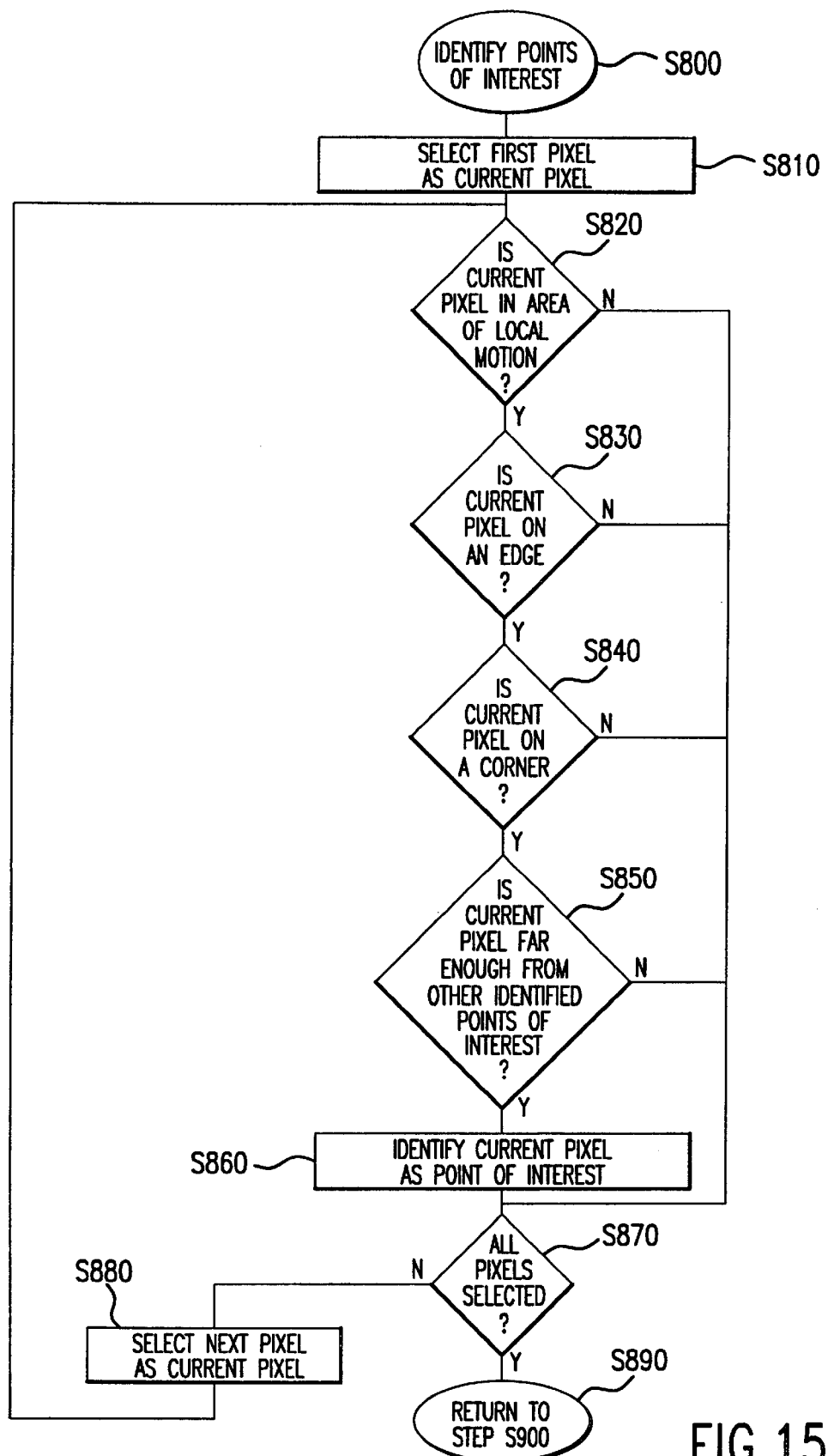
FIG. 15 is a flowchart outlining in greater detail one exemplary embodiment of the points of interest identifying method of FIG. 12 according to this invention.

FIG. 15 is a flowchart outlining in greater detail one exemplary embodiment of identifying the points of interest. Beginning in step S800, control continues to step S810, where a first pixel is selected as the current pixel. Then, in step S820, the current pixel is analyzed to determine if the current pixel is in an area of local motion. If so, control continues to step S830. Otherwise, control jumps to step S870.

In step S830, the current pixel is further analyzed to determine if the current pixel is on an edge of a feature in the base field or frame. If so, control continues to step S840. Otherwise, control again jumps to step S870.

In step S840, the current pixel is analyzed to determine if the current pixel is on a corner of a feature. If so, control continues to step S850. Otherwise, control jumps again to step S870.

In step S850, the current pixel is analyzed to determine if the current pixel is sufficiently far enough from other, previously-identified, points of interest. If so, control continues to step S860. Otherwise, control again jumps to step S870.

In step S860, because the current pixel is in the area of local motion, is on a corner of an edge of a feature in the base field or frame, and is sufficiently far enough from other previously-identified points of interest, the current pixel is identified as another point of interest. Then, in step S870, the base field or frame is checked to determine if all pixels in the base field or frame have been selected. If any pixels in the base field or frame remain to be selected, control continues to step S880. Otherwise, control jumps to step S890.

In step S880, a next pixel of the base field or frame is selected as the current pixel. Control then jumps back to step S820. In contrast, in step S890, control returns to step S900.

Figure 16:
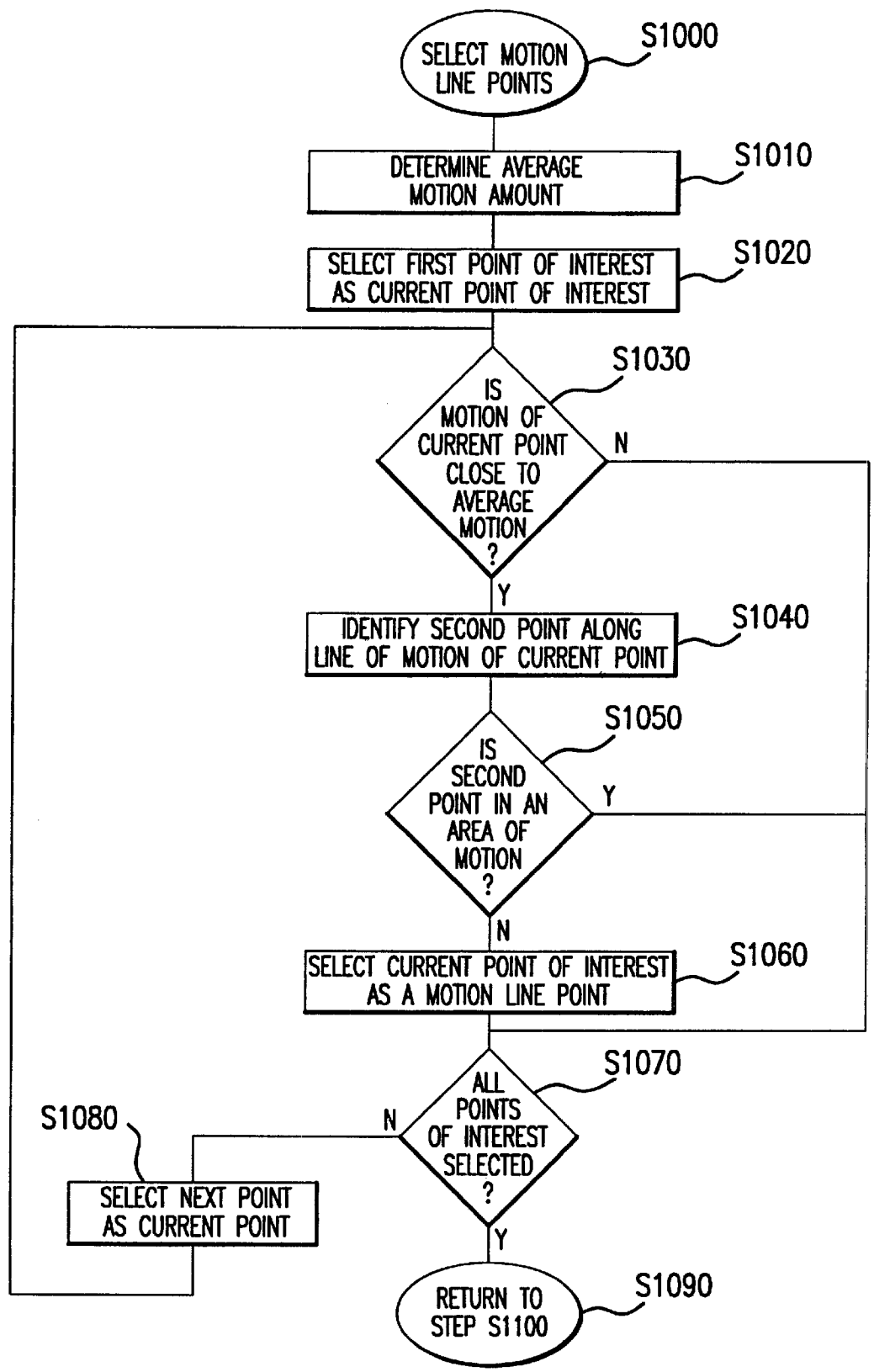
FIG. 16 is a flowchart outlining in greater detail one exemplary embodiment of the motion line points selecting method of FIG. 12 according to this invention.

FIG. 16 is a flowchart outlining in greater detail one exemplary embodiment of selecting the motion line points.

Beginning in step S1000, control continues to step S1010, where an average motion amount is determined. Next, in step S1020, a first point of interest is selected as a current point of interest. Then, in step S1030, the current point of interest is analyzed to determine if the motion of the current point of interest is close to the average motion. If so, control continues to step S1040. Otherwise, control jumps to step S1070.

In step S1040, a second point along the line of motion of the current point of interest is identified. Then, in step S1050, the second point of interest is analyzed to determine if the second point of interest is also in an area of motion. If not, control continues to step S1060. Otherwise, control jumps to step S1070.

In step S1060, because the motion of the current point of interest is close to the average motion, and the identified second point is not also in an area of motion, the current point of interest is selected as a motion line point. Then, in step S1070, the list of points of interest is checked to determine if any point of interest remains to be selected. If any points of interest remain to be selected, control continues to step S1080. Otherwise, control jumps to step S1090.

In step S1080, a next point of interest is selected as the current point of interest. Control then jumps back to step S1030. In contrast, in step S1090, control returns to step S1100.

The motion line adding system 400 shown in FIGS. 3–10 is preferably implemented on a programmed general purpose computer. However, the motion line adding system 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 12–16, can be used to implement the motion line adding system 400.

Similarly, the motion line adding system 500 shown in FIG. 11 is preferably implemented on a programmed general purpose computer. However, the motion line adding system 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 12–16, can be used to implement the motion line adding system 500.

The memory 430 and the various buffers 442, 446, 448, 463, 467 and 474 shown in FIGS. 3–10 and the various buffers and memories 522, 524, 534, 540, 552 and 582 shown in FIG. 11 are preferably implemented using static or dynamic RAM. However, the memory 430 and the various buffers 442, 446, 448, 463, 467 and 474 shown in FIGS. 3–10 and the various buffers and memories 522, 524, 534, 540, 552 and 582 shown in FIG. 11 can also be implemented using a floppy disk and disk drive, a writable optical disk and disk drive, a hard drive, flash memory or any other known or later-developed alterable volatile or non-volatile memory device or system.

While FIG. 3 shows the motion line adding system 400 as a separate device from the video image data source 200, the motion line adding system 400 may be an integrated device. With such a configuration, for example, the video image data source 200, the motion line adding system 400 and the image data sink 300 may be contained within a single device.

Alternatively, the motion line adding system 400 may be implemented as software executing on the image data sink 300 or the image data source 200. For example, the motion line adding system 400 may be incorporated into a video camera or a video capture/printer system. Other configurations of the elements shown in FIG. 3 may be used without departing from the spirit and scope of this invention.

While this invention has been described in conjunction with the specific exemplary embodiments outlined above, it is evident that many alternatives, modifications and variations will be apparent to those skilled in the art. Accordingly, the preferred embodiments of the invention as set forth above, are intended to be illustrative, not limiting. Various changes may be made without departing from the spirit and scope of the invention.

What is claimed is:

1. A method for indicating motion in a still image captured from a video data signal, comprising:

capturing a first portion of the video data signal;

capturing a second portion of the video data signal;

characterizing the motion between the first and second portions of the video data signal; and adding, for each of at least one pixel in the first portion, a motion line to the image, the motion line extending from that pixel, based on the characterized motion corresponding to that pixel.

2. The method of claim 1, where adding the motion line to each of the at least one pixel in the first portion comprises:

modifying one of the first and second portions of the video data signal to compensate for the characterized motion between the first and second portions of the video data signal;

identifying at least one region of motion between the modified one of the first and second portions and the unmodified one of the first and second portions;

identifying points of interest in the at least one region of motion;

determining, for each identified point of interest, at least one of an amount of motion between the first and second portions and a direction of motion between the first and second portions;

selecting pixels from among the identified points of interest; and adding, for each selected pixel in the first portion, a motion line extending from that selected pixel based on at least one of the at least one of the determined amount of motion and determined direction of motion corresponding to that selected pixel.

3. The method of claim 2, wherein identifying points of interest comprises identifying, for each point of interest, at least one intensity gradient in image values between that point of interest and pixels adjacent to that point of interest.

4. The method of claim 3, wherein identifying the at least one intensity gradient comprises identifying intensity gradients that are greater than a predetermined threshold.

5. The method of claim 2, wherein selecting pixels from the identified points of interest comprises:

identifying, for each point of interest, whether that point of interest lies along an edge; and selecting that point of interest only if it lies along an edge.

6. The method of claim 2, wherein selecting pixels from the identified points of interest comprises:

identifying, for each point of interest, whether that point of interest lies at a corner; and selecting that point of interest only if it lies at a corner.

7. The method of claim 2, wherein selecting pixels from the identified points of interest comprises:

examining, for each point of interest, a color of that point of interest and a color of each of a plurality of neighboring connected pixels; and selecting each point of interest having a number of neighboring connected pixels having a same color as a color of that point of interest that is smaller than a number of neighboring connected pixels having a color different than the color of that point of interest.

8. The method of claim 2, wherein selecting pixels from the identified points of interest comprises:

identifying, for each point of interest, whether that point of interest lies on a leading edge of the region of motion with respect to a direction of motion of the region of motion; and selecting that point of interest only if it does not lie on a leading edge of the region of motion.

9. The method of claim 2, wherein selecting pixels from the identified points of interest comprises:

increasing, for each point of interest, the determined amount of motion by a predetermined factor;

identifying a pixel in the first portion based on the increased amount of motion;

determining whether the identified pixel is in the at least one region of motion; and selecting that point of interest only if the identified pixel is not in the at least one region of motion.

10. The method of claim 9, wherein increasing the determined amount of motion comprises adding a predetermined amount of motion to the determined amount of motion.

11. The method of claim 9, wherein increasing the determined amount of motion comprises multiplying the determined amount of motion by a predetermined number.

12. The method of claim 2, wherein selecting pixels from the identified points of interest comprises:

determining an average amount of motion for the identified points of interest; and selecting only those points of interest that have an amount of motion that is consistent with the determined average amount of motion.

13. The method of claim 12, wherein, for each point of interest, the determined average motion is a local average of nearby identified points of interest.

14. The method of claim 12, wherein, for each point of interest, the determined average motion is an overall average of all identified points of interest.

15. The method of claim 2, wherein identifying points of interest in the at least one region of motion comprises selecting pixels that are spaced from each other by at least a predetermined minimum distance.

16. The method of claim 2, wherein determining, for each identified point of interest, the amount of motion comprises:

comparing intensities of each pixel in a block of pixels surrounding that identified pixel in the first portion with a corresponding pixel in each of a plurality of blocks of pixels in the second portion, each block of pixels in the second portion located at a different position in the second portion;

determining which of the plurality of blocks of pixels in the second portion has a minimum intensity difference relative to the block of pixels in the first portion; and determining an amount of displacement between the determined block of pixels in the second portion relative to the block of pixels in the first portion as the amount of motion.

17. The method of claim 16, wherein determining, for each identified point of interest, the amount of motion further comprises low-pass filtering each of the blocks of pixels in the first and second portions prior to comparing the intensities.

18. The method of claim 2, wherein adding the motion lines further comprises adding, for each selected pixel, a motion line extending from that selected pixel in the determined direction of the motion of that selected pixel.

19. The method of claim 2, wherein a length of the motion line for each selected pixel is proportional to the amount of motion of that selected pixel.

20. The method of claim 19, wherein the length of the motion line for each selected pixel indicates a magnitude of the amount of motion of that selected pixel.

21. The method of claim 19, wherein the direction of the motion line for each selected pixel indicates a direction of the motion of that selected pixel.

22. The method of claim 2, wherein adding the motion lines further comprises:

determining a direction that is an average direction of the motion of all of the selected pixels; and adding, for each selected pixel, a motion line extending from that selected pixel in the determined average direction.

23. The method of claim 2, wherein:

characterizing the motion between the first and second portions of the video data signal comprises determining global motion between the first and second portions; and modifying one of the first and second portions of the video data signal to compensate for the characterized motion between the first and second portions of the video data signal comprises modifying one of the first and second portions to compensate for the determined global motion.

24. The method of claim 1, further comprising:

capturing a third portion of the video data signal; and characterizing the motion between the first and third portions of the video data signal;

wherein adding, for each of the at least one pixel in the first portion, the motion line further comprises adding the motion line to that pixel based on the characterized motion between the first and third portions corresponding to that pixel.

25. The method of claim 24, where adding the motion line to each of the at least one pixel in the first portion based on the characterized motion between the first, second and third portions corresponding to that pixel comprises:

modifying one of the first and third portions of the video data signal to compensate for the characterized motion between the first and third portions of the video data signal;

identifying at least one region of motion between the modified one of the first and third portions and the unmodified one of the first and third portions;

identifying points of interest in the at least one region of motion;

determining, for each identified point of interest, at least one of an amount of motion between the first and third portions and a direction of motion between the first and third portions; and selecting pixels from among the identified points of interest;

wherein adding, for each selected pixel in the first portion, the motion line extending from that selected pixel based on at least one of the determined amount of motion and the determined direction of motion corresponding to that selected pixel comprises fitting the motion line to a curve defined by at least one of the determined amounts and the directions of motion between the first, second and third portions corresponding to that selected pixel.

26. The method of claim 25, wherein:

characterizing the motion between the first and third portions of the video data signal comprises determining global motion between the first and third portions; and modifying one of the first and third portions of the video data signal to compensate for the characterized motion between the first and third portions of the video data signal comprises modifying one of the first and third portions to compensate for the determined global motion.

27. A motion line adding system that adds motion lines to a still image captured from a video data signal, the motion lines indicating motion in the still image, comprising:

a video frame capture subsystem that captures at least a plurality of fields of the video data signal;

a global motion compensation subsystem that removes global motion between pairs of captured fields or frames of the video data signal;

a motion determining subsystem that determines motion between pairs of global motion compensated fields or frames of the video data signal; and a motion line adding subsystem that adds motion lines to the image, the motion lines extending from selected pixels of a frame of the video data signal, based on the determined motion.

28. The motion line adding system of claim 27, wherein the video frame capture subsystem comprises:

a video data signal buffer that stores fields or frames of the video data signal;

a current field/frame buffer that stores a base field or frame of the video data signal;

a previous field/frame buffer that stores a previous field or frame of the video data signal;

a field/frame selector that selects a field or frame from the video data signal buffer and that stores the selected field or frame in one of the current and previous field/frame buffers.

29. The motion line adding system of claim 27, wherein the global motion compensation subsystem comprises:

a global motion analyzer that determines, for each pair of fields or each pair of frames, an amount of global motion; and a global motion compensator that modifies, for each pair of fields or frames, one of the fields or frames based on the determined global motion.

30. The motion line adding system of claim 29, wherein:

the global motion analyzer further determines, for each pair of global compensated fields, an amount of local motion; and the global motion compensation subsystem further comprises a local motion compensator that modifies, for each pair of global motion compensated fields, the global compensated field based on the determined local motion.

31. The motion line adding system of claim 27, wherein the motion determining subsystem comprises:

a motion mask generator that generates a motion mask based on the determined motion between each pair of global motion compensated fields or frames of the video data signal; and a candidate point selection subsystem that selects candidate pixels from one of the pairs of global motion compensated fields or frames of the video data signal and that determines at least one of an amount of motion and a direction of motion for each selected candidate point.

32. The motion line adding system of claim 31, wherein the motion mask generator comprises:

a field/frame comparator that compares the fields or frames of each pair of fields or frames to generate the motion mask; and a motion mask buffer that stores the motion mask generated by the field/frame comparator.

33. The motion line adding system of claim 30, wherein the candidate point selection subsystem comprises:

a candidate point selector that selects candidate pixels from one of the pair of fields or frames based on the motion mask;

a candidate point list buffer that stores the selected candidate pixels; and a motion estimator that estimates the at least one of the amount of motion and the direction of motion for each selected candidate pixel.

34. The motion line adding system of claim 33, wherein the motion line adding subsystem comprises:

a selected point extractor that selects pixels from the selected candidate pixels stored in the candidate point list buffer;

a selected point list buffer that stores the selected pixels; and a motion line generator that generates a motion line for each selected pixel based on the determined at least one of the amount and direction of motion for that selected pixel and that adds the generated motion line to the frame of the video data signal.

* * * * *